United States Patent
Mirtsching et al.

(10) Patent No.: US 7,892,076 B2
(45) Date of Patent: Feb. 22, 2011

(54) MULTIBAR APPARATUS AND METHOD FOR ELECTRICALLY STIMULATING A CARCASS

(75) Inventors: Warren Mirtsching, Ft. Collins, CO (US); Kelly Lacy, Eaton, CO (US)

(73) Assignee: Swift & Company, Greeley, CO (US)

( * ) Notice: Subject to any disclaimer, the term of this patent is extended or adjusted under 35 U.S.C. 154(b) by 803 days.

(21) Appl. No.: 11/748,835

(22) Filed: May 15, 2007

(65) Prior Publication Data

US 2007/0287370 A1     Dec. 13, 2007

Related U.S. Application Data

(60) Provisional application No. 60/802,674, filed on May 22, 2006.

(51) Int. Cl.
    *A22C 9/00* (2006.01)
(52) U.S. Cl. ...................................... 452/141
(58) Field of Classification Search .................. 452/57, 452/58, 141–144, 198
See application file for complete search history.

(56) References Cited

U.S. PATENT DOCUMENTS

| | | | |
|---|---|---|---|
| 337,334 A | 3/1886 | Jones et al. | |
| 1,485,755 A | 3/1924 | Alcock | |
| 1,900,573 A | 3/1933 | McArthur | |
| 2,544,681 A | 3/1951 | Harsham et al. | |
| 2,544,724 A | 3/1951 | Rentschler | |
| 2,621,362 A | 10/1952 | Cosden | |
| 2,870,018 A | 1/1959 | Person et al. | |
| 2,879,539 A | 3/1959 | Cervin | |
| 2,979,411 A | 4/1961 | Pircon | |
| 3,314,103 A | 4/1967 | Rains | |

(Continued)

FOREIGN PATENT DOCUMENTS

AU     2003272338 A1     3/2004

(Continued)

OTHER PUBLICATIONS

Kerth, Electrical Stimulation Effects on Tenderness of Five Muscles from Hampshire x Rambouillet Crossbred Lambs with the Callipyge Phenotype, J. Anim. Sci., 77:2951-2955 (1999).

(Continued)

*Primary Examiner*—Thomas Price
(74) *Attorney, Agent, or Firm*—Sheridan Ross P.C.

(57) ABSTRACT

The present invention is directed to a method and apparatus for the differential and purposeful stimulation of an animal carcass, i.e. substantially an entire animal carcass, without the purge problems typically found in the anterior and posterior portions of the animal carcass. In one embodiment, the method includes electrically stimulating at least a first section of the animal carcass to a first degree and electrically stimulating at least a second section of the animal carcass to a second degree less than the first degree. In one embodiment, the muscles of the midsection are electrically stimulated to a first degree and the muscles of the anterior and posterior end sections are electrically stimulated to a second degree less than the first degree. An apparatus for carrying out the methods of the present invention are further provided.

11 Claims, 10 Drawing Sheets

U.S. PATENT DOCUMENTS

| | | | |
|---|---|---|---|
| 3,537,130 A | 11/1970 | McDonnell | |
| 3,626,550 A | 12/1971 | Troy | |
| 3,657,770 A | 4/1972 | Wallace | |
| 3,736,622 A | 6/1973 | Wallace | |
| 3,863,294 A | 2/1975 | Barbee | |
| 4,023,574 A * | 5/1977 | Nemec | 607/67 |
| 4,221,021 A | 9/1980 | Swilley | |
| 4,307,490 A | 12/1981 | Watkins et al. | |
| 4,340,993 A | 7/1982 | Cook | |
| 4,358,872 A | 11/1982 | VanZandt | |
| 4,495,676 A | 1/1985 | Hartmetz | |
| 4,561,149 A | 12/1985 | Nijhuis | |
| 4,675,947 A | 6/1987 | Clatfelter et al. | |
| 4,774,741 A | 10/1988 | Bernharadt et al. | |
| 4,827,727 A | 5/1989 | Caracciolo | |
| 4,860,403 A | 8/1989 | Webb et al. | |
| 5,007,336 A | 4/1991 | Bernhardt et al. | |
| 5,167,569 A | 12/1992 | Davis | |
| 5,282,940 A | 2/1994 | Griffis et al. | |
| 5,486,145 A * | 1/1996 | Dorsthorst et al. | 452/58 |
| 5,512,014 A | 4/1996 | Burnett | |
| 5,595,066 A | 1/1997 | Zwanikken et al. | |
| 5,704,830 A * | 1/1998 | Van Ochten | 452/58 |
| 5,855,507 A | 1/1999 | Fisher et al. | |
| 5,879,732 A | 3/1999 | Caracciolo, Jr. et al. | |
| 5,888,132 A | 3/1999 | Burnett | |
| 5,899,802 A | 5/1999 | Burnett | |
| 6,001,655 A | 12/1999 | Spadaro et al. | |
| 6,019,674 A | 2/2000 | Austin | |
| 6,159,090 A | 12/2000 | Thompson | |
| 6,190,250 B1 | 2/2001 | Volk et al. | |
| RE37,266 E | 7/2001 | Dorsthorst et al. | |
| 6,290,592 B1 * | 9/2001 | Allen et al. | 452/58 |
| 6,322,436 B2 | 11/2001 | Potter et al. | |
| 6,364,759 B2 * | 4/2002 | Allen et al. | 452/141 |
| 6,458,024 B1 | 10/2002 | Potter et al. | |
| 6,478,667 B2 * | 11/2002 | Bell et al. | 452/141 |
| 6,519,954 B1 | 2/2003 | Prien et al. | |
| 6,648,744 B2 * | 11/2003 | Bell et al. | 452/141 |
| 6,712,685 B2 | 3/2004 | Potter et al. | |
| 6,724,309 B2 | 4/2004 | Grose et al. | |
| 6,796,892 B2 | 9/2004 | Allen et al. | |
| 6,896,607 B2 | 5/2005 | Potter et al. | |
| 6,975,233 B2 | 12/2005 | Grose et al. | |
| 7,022,005 B2 | 4/2006 | Potter et al. | |
| 7,025,669 B2 * | 4/2006 | Richards | 452/141 |
| 2001/0031617 A1 | 10/2001 | Allen et al. | |
| 2001/0034201 A1 | 10/2001 | Bell et al. | |
| 2002/0054940 A1 | 5/2002 | Grose et al. | |
| 2002/0077055 A1 | 6/2002 | Allen et al. | |
| 2002/0182999 A1 | 12/2002 | Bell et al. | |
| 2003/0154729 A1 | 8/2003 | Prien et al. | |
| 2003/0190879 A1 | 10/2003 | Bell et al. | |
| 2003/0198724 A1 | 10/2003 | Schaefer et al. | |
| 2004/0095242 A1 | 5/2004 | Grose et al. | |
| 2004/0115322 A1 | 6/2004 | Obsorn | |
| 2005/0042980 A1 | 2/2005 | Allen et al. | |
| 2005/0142997 A1 | 6/2005 | Richards | |
| 2005/0181720 A1 | 8/2005 | Osborn | |
| 2005/0221746 A1 | 10/2005 | Bell et al. | |

FOREIGN PATENT DOCUMENTS

| | | |
|---|---|---|
| AU | 760810 | 12/2005 |
| CA | 2372042 | 11/2000 |
| CA | 2497726 A1 | 3/2004 |
| EP | 0090478 | 10/1983 |
| EP | 0353199 | 1/1990 |
| EP | 1175151 | 8/2005 |
| FR | 2495438 | 6/1982 |
| FR | 2519846 | 7/1983 |
| GB | 1478258 | 6/1977 |
| GB | 2147791 | 5/1985 |
| JP | 8009876 | 1/1996 |
| JP | 8023869 | 1/1996 |
| SU | 833182 | 5/1981 |
| SU | 1009382 | 4/1983 |
| SU | 1391566 | 4/1988 |
| WO | WO8101641 | 6/1981 |
| WO | WO9819550 | 5/1998 |
| WO | WO0154509 | 8/2001 |
| WO | WO0195716 | 12/2001 |
| WO | WO0247485 | 6/2002 |
| WO | WO02058474 | 8/2002 |
| WO | WO2004085997 A2 | 3/2004 |
| WO | WO2004085997 | 10/2004 |
| WO | WO2005099466 | 10/2005 |

OTHER PUBLICATIONS

Roeber, Effects of a Unique Application of Electrical Stimulation on Tenderness, Color, and Quality Attributes of the Beef Longissimus Muscle, J. Anim. Sci., 78:1504-1509 (2000).

Savell, Effect of Electrical Stimulation on Palatability of Beef, Lamb and Goat Meat, Journal of Food Science, vol. 42, No. 3, 1977, pp. 702-706.

Bosilevac, Development and Evaluation of an On-Line Hide Decontamination Procedure for Use in a Commercial Beef Processing Plant, Journal of Food Protection, vol. 68, No. 2, 2005, pp. 265-272.

Westervelt, Relationship Among Spinal Cord Severing, Electrical Stimulation and Postmortem Quality Characteristics of the Porcine Carcass, Journal of Animal Science, vol. 46, No. 5, 1978, pp. 1206-1211.

Miller, Bovine Longissimus dorsi Muscle Glycogen and Color Response as Affected by Dietary Regimen and Post-Mortem Electrical Stimulation in Young Bulls, Meat Science 19, 1987, pp. 253-263.

Eilers, Modification of Early-Postmortem Muscle pH and Use of Postmortem Aging to Improve Beef Tenderness, J. Anim. Sci., 74:790-798 (1996).

Stiffler, Electrical Stimulation Purpose, Application, and Results, Bulletin, Texas Agricultural Extension Service, 1982, pp. 1-8.

Eikelenboom, The Effect of High and Low Voltage Electrical Stimulation on Beef Quality, Meat Science 15, 1985, pp. 247-254.

Federal Register, Cooling and Chilling Requirements for Raw Meat and Poultry, vol. 61, No. 144, p. 38856 (Jul. 25, 1996).

Northcutt, Reference Guide for Solving Poultry Processing Problems, Bulletin 1156, May 1997, The University of Georgia College of Agricultural and Environmental Sciences.

Epley, Meat Tenderness, retrieved from website http://www.extension.umn.edu/distribution/nutrition/DJ0856 on Apr. 4, 2006, 8 pages.

Cross, Influence of Breed, Sex, Age and Electrical Stimulation on Carcass and Palatability Traits of Three Bovine Muscles, Journal of Animal Science, vol. 58, No. 6, 1984, pp. 1358-1365.

Tatum, New Approaches for Improving Tenderness, Quality, and Consistency of Beef, Proceedings of the American Society of Animal Science, 1999.

Morgan, National Beef Tenderness Survey, J. Anim. Sci. 69:3274-3283 (1991).

Savell, A Research Note: Influence of Electrical Stimulation on Certain Characteristics of Heavy-Weight Beef Carcasses.

Boleman, National Beef Quality Audit—1995: Survey of Producer-Related Defects and Carcass Quality and Quantity Attributes, J. Anim. Sci. 76:96-103 (1998).

McKeith, Tenderness Improvement of the Major Muscles of the Beef Carcass by Electric Stimulation, Journal of Food Science, vol. 46, 1981, pp. 1774-1776.

Ducastaing, Effects of Electrical Stimulation on Post-mortem Changes in the Activities of Two Ca Dependent Neutral Proteinases and their Inhibitor in Beef Muscle, Meat Science 15, 1985, pp. 193-202.

Mies, Effects of Postmortem Aging on Beef Tenderness and Aging Guidelines to Maximize Tenderness of Different Beef Subprimal cuts, Program in Meat Science, Department of Animal Studies, Colorado State University, pp. 127-133.

Clare, Improving Tenderness of Normal and Callipyge Lambs with Calcium Chloride, J. Anim. Sci. 75:377-385 (1997).

Takahashi, Effects of Low-Frequency Electrical Stimulation on Beef Tenderness, Meat Science 11, 1984, pp. 207-225.

McNeal, Effects of Stunning and Decapitation on Broiler Activity During Bleeding, Blood Loss, Carcass, and Breast Meat Quality, Poultry Science 82:163-168 (2003).

Hildrum, Combined Effects of Chilling Rate, Low Voltage Electrical Stimulation and Freezing on Sensory Properties of Bovine M. Longissimus Dorsi, Meat Science 52, 1999, pp. 1-7.

Ferguson, Meat Standards Australia, A 'PACCP' Based Beef Grading Scheme for Consumers, 3) PACCP Requirements that Apply to Carcass Processing, 45th International Congress of Meat Science and Technology, Yokohama, Japan, 45:18-19 (1999).

Crouse, The Effect of Carcass Electrical Stimulation on Meat Obtained From Bos Indicus and Bos Taurus Cattle, Journal of Food Quality, 10, 1987, pp. 407-416.

Fabiansson, The Influence of Low Voltage Electrical Stimulation on Some Physical and Sensoric Properties of Beef, Acta Agric Scand, 34:368-376 (1984).

Purchas, Effects of Growth Potential and Growth Path on Tenderness of Beef Longissimus Muscle From Bulls and Steers, J. Anim. Sci. 80:3211-3221 (2002).

Davey, Carcass Electrical Stimulation to Prevent Cold Shortening Toughness in Beef, Refrigeration Science and Technology, 1977, pp. 293-298.

* cited by examiner

MULTIBAR APPARATUS AND METHOD FOR ELECTRICALLY STIMULATING A CARCASS

CROSS-REFERENCE TO RELATED APPLICATIONS

This application claims the benefit of U.S. Provisional Application No. 60/802,674, filed May 22, 2006, the entire disclosure of which is hereby incorporated herein by reference.

FIELD OF THE INVENTION

The present invention relates to a method and apparatus for electrically stimulating an animal carcass, and more particularly to a method and apparatus for the differential and purposeful electrical stimulation of an animal carcass.

BACKGROUND OF THE INVENTION

The benefits of electrical stimulation to increase the tenderness of meat product are well known in the art of meat processing. In fact, the use of electrical stimulation to improve the tenderness of meat has been used since at least as early as 1749 by Benjamin Franklin, who first found that turkey meat was tenderer if the bird was killed by an electric shock rather than by other methods. It is believed that electrical stimulation at least accelerates the process of rigor mortis and prevents "cold shortening" as the carcass is immediately chilled to prevent bacterial contamination. Cold shortening is caused by the release of stored calcium ions from the sarcoplasmic reticulum of muscle fibers in response to cooling of carcass. The calcium ions trigger powerful muscle contractions aided by ATP molecules. To prevent cold shortening, the muscles of the carcass may be electrically stimulated, thereby causing them to contract and relax, which depletes the ATP reserve from the carcass and prevents cold shortening.

One problem associated with electrical stimulation is that the application of electric current to the carcass is known to generate heat in the muscles of the carcass and increase the internal muscle temperature of the carcass. As explained by U.S. Pat. Nos. 6,290,592 and 6,364,759, the entireties of which are incorporated by reference herein, if the meat of the carcass is not cooled to at least a minimum level, i.e. below about 65° F., prior to the completion of rigor mortis, a condition called pale soft exudative (PSE) may result that causes the slaughtered meat to be pale in color, soft and watery. Moreover, if the meat temperature is too high when the muscle enters rigor mortis, the meat will have a tendency to lose moisture content or purge its natural juices, be pale in color, and be softer than normal when the meat cools to its desired level. Excess purge from PSE meat is a significant problem in the meat processing industry.

U.S. Pat. Nos. 6,290,592 and 6,364,759 each point out that particular portions of an animal carcass are particularly susceptible to purge problems. The beef industry generally categorizes the animal carcass, whether split or whole, into at least three sections: the midsection, chuck, and round. The midsection generally includes the thinner muscles of the rib and loin that are generally characterized as extending from about between the fifth and sixth thoracic vertebrae and about between the fourth and fifth sacral vertebrae. The anterior portion of the animal carcass includes the shoulder muscles that the beef industry refers to as the chuck. The posterior end of the animal carcass includes the hind limb muscles that the beef industry generally refers to as the round. Generally, the muscles of the chuck and round are thicker and denser than the thinner muscles of the rib and loin. Accordingly, the chuck and round muscles, if electrically stimulated, generally take more time to cool and are more susceptible to excessive purge.

The solution to minimize purge problems in the thicker meat sections offered in U.S. Pat. Nos. 6,290,592 and 6,364,759 is to isolate the muscles of the anterior end section (chuck) and posterior end section (round) to provide electrically stimulated muscles in the midsection and non-electrically stimulated muscles in the anterior and posterior end sections. In one embodiment, as shown in Prior Art FIG. 1, U.S. Pat. Nos. 6,290,592 and 6,364,759 disclose an electrical stimulation apparatus 5 having three distinct sharpened aluminum stakes, each of which are inserted into the muscles of the carcass 1. One "hot" stake 7 is inserted into the muscles of the midsection 9 of the animal and two ground stakes 11, 13 are inserted into the muscles of the posterior end section 15 in the vicinity of the fourth or fifth sacral vertebrae (separation point of the carcass loin 17 and round 19 section) and into the muscles of the anterior end section 21 in the vicinity of the fifth and sixth thoracic vertebrae (separation point between the rib 23 and chuck 27 sections) respectively. In this way, the muscles of the chuck and round of the animal are isolated from receiving electrical stimulation, thus precluding purge problems in the isolated chuck and round sections.

In another embodiment, as shown in Prior Art FIG. 2, U.S. Pat. Nos. 6,290,592 and 6,364,759 disclose an apparatus having upper grounds 424, 430 that contact the animal carcass in the posterior end section of the carcass at a location corresponding to between about the eleventh thoracic vertebrae and about the second lumbar vertebrae. The apparatus further includes lower grounds 426, 432 that contact the animal carcass in the anterior end section of the carcass at a location corresponding to about the fifth and sixth thoracic vertebrae. A plurality of electrical stimulation probes 450 are provided that extend into the path of travel of the animal carcass, preferably at an angle of about 50 to 130 degrees, to contact the animal carcass in the midsection of the animal. In this way, the muscles of the midsection are electrically stimulated while the muscles of the chuck and round of the animal are isolated from receiving electrical stimulation, thereby precluding purge problems in the isolated chuck and round sections.

While U.S. Pat. Nos. 6,290,592 and 6,364,759 disclose methods and apparatuses that address purge problems in the chuck and round sections by preventing the muscles of the chuck and round from being electrically stimulated, the methods and apparatuses of U.S. Pat. Nos. 6,290,592 and 6,364,759 actually deprive the chuck and round, which still contain valuable meat sections for commercial sale, of the well-known benefits of electrical stimulation, including tenderizing of the meat. Thus, there is a need for a method and apparatus for electrically stimulating an animal carcass, including thick meat sections thereof, without the undesired purge problems associated with known methods of electrical stimulation.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

SUMMARY OF THE INVENTION

These and other needs are addressed by the various embodiments and configurations of the present invention. In accordance with one aspect of the present invention, there is provided a method and apparatus for purposely and differentially electrically stimulating the muscles of an animal carcass. In one embodiment, the method and apparatus selectively stimulate the muscles of the carcass differentially by electrically stimulating the muscles of at least one section of the carcass to a greater degree than the muscles of at least a second section of the carcass. For example, in one embodiment, the muscles of the midsection of the carcass, as well as the muscles of the anterior and posterior end sections, are purposefully electrically stimulated. However, the muscles of the midsection of the carcass are preferably electrically stimulated to a greater degree than the anterior and/or posterior end portions of the carcass. As used herein, "animal carcass," includes a whole carcass, substantially all of a whole carcass, a split carcass, or other subdivisions of a carcass.

While not wishing to be bound by theory, it is believed that electrical stimulation causes the muscles of the carcass to contract, and that the further stimulation of the muscles (once the individual muscle fibers are already contracted) generates heat and causes the internal temperature of the muscle to increase. A high internal muscle temperature is particularly a problem if the muscles of the carcass do not cool to below about 65° F. prior to the onset of rigor mortis. If the muscles do not cool to below about 65° F. prior to the onset of rigor mortis, pale soft exudative ("PSE") may result. PSE generally causes the meat to lose moisture content and purge its natural juices, making the meat less commercially desirable. Due to the thickness and density of the muscles of the anterior end portion of the carcass and the posterior end portion of the carcass, the muscles of the anterior and posterior end sections are particularly susceptible to purge problems.

Nevertheless, because of the considerable benefits provided by electrical stimulation to tenderize the meat of the carcass, the present inventors believe it is desirable to electrically stimulate the muscles of the anterior end section and posterior end sections, as well as the midsection of the carcass. The present invention enables the muscles of substantially the entire animal carcass to be electrically stimulated while avoiding purge problems associated with known methods of electrical stimulation, particularly purge problems in the anterior and posterior end sections of the carcass.

Preferred animal carcasses that can be processed according to the invention include bovine carcasses, such as, bull, heifer, cow, and steer carcasses. Additional animal carcasses, however, that can be processed according to the invention include porcine, buffalo, elk, deer, ovine, and poultry carcasses.

In accordance with one aspect of the present invention, there is provided a method for differentially and purposefully electrically stimulating the muscles of an entire carcass comprising electrically stimulating the muscles of at least a first section of the carcass to a first degree and electrically stimulating the muscles of at least a second section of the carcass to a second degree, preferably less than the first degree. For example, in one embodiment, there is provided a method for electrically stimulating the muscles of substantially an entire animal carcass, wherein the muscles of the midsection of the carcass are electrically stimulated to a first degree, which is greater than a degree to which the muscles of the anterior end section and posterior end section of the animal carcass are electrically stimulated. It is appreciated that by electrically stimulating the anterior and posterior sections to a second degree, it is meant that the end sections are targeted for electrical stimulation. In other words, the anterior and/or posterior end sections may be targeted for electrical stimulation, and the end section may receive a minor amount of electrical stimulation.

It is contemplated within the scope of the present invention that any number of suitable structures or methods may be utilized, alone or in combination, to electrically stimulate at least one section of the carcass, i.e. the midsection, to a greater degree than at least a second section of the carcass, i.e. the anterior and/or posterior end sections of the carcass. For example, in one embodiment, the amount of electric current, whether direct current, alternating current, or both, is applied in a greater amount to at least one section of the carcass as compared to at least a second section of the carcass. It is understood that to provide a greater amount of electric current to a particular section of the carcass, the voltage used to supply the electric current will also be increased accordingly.

In another embodiment, electric current may be applied to at least a first section of the carcass for a longer duration relative to at least a second section of the carcass. For example, electric current may be applied to the midsection of the carcass for a duration of about 2 seconds with a period of rest between successive cycles while electric current is applied to the anterior and/or posterior end sections for a duration of about 1 second with the same period of rest between successive cycles. In this way, the muscles of the midsection will likely be electrically stimulated to a greater degree than the muscles of the posterior and anterior end sections. Typically, the targeted muscles of the carcass are electrically stimulated for a total period of about 30 to about 60 seconds.

Alternatively, electric current may be applied to at least a first section of the carcass and to at least a second section of the carcass for the same duration. However, the time period between applications of electric current to at least a first section of the carcass may be for a shorter time period relative to the time period between applications of electric current in at least a second section of the carcass. During the time period between applications of electric current, either no electric current or a reduced amount of electric current may be delivered to the carcass.

For example, the time period of rest or reduced current between successive cycles of electric current to the midsection may be about 1 second while the time period of rest or reduced current between cycles of electric current to the anterior end section and/or posterior end section may be for about 2 seconds. In this way, the muscles of the midsection will likely be electrically stimulated to a greater degree than the anterior and/or posterior end sections.

In yet another embodiment, electric current may be applied to one section of the carcass in a plurality of cycles of a same or similar voltage while current is applied to yet another section of the carcass in cycles of increasing voltage. For example, electric current could be applied to the midsection in eight 60 volts cycles while electric current may be applied to the anterior and/or posterior end sections in cycles of increasing voltage, such as cycles of 20, 20, 30, 30, 40, 40, 50, and 50 volts. In this way, the muscles of the chuck and round, for example, may receive increasing or decreasing amounts of electric current up to a predetermined threshold without increasing the internal muscle temperature to a degree which could result in undesirable purge problems.

In one embodiment, since it is desirable that the muscles of the carcass are sufficiently cooled prior to rigor mortis and because electrical stimulation typically increases the muscle temperature once substantially all of the particular muscle fibers of the targeted muscles are contracted, the present invention further includes cooling the carcass before, after, and/or simultaneously to the application of electric current to the carcass. The cooling may be performed by any suitable method. In one embodiment, the carcass is electrically stimulated in a relatively cooler environment, for example, at a temperature of between about 0° F. and 65° F., and more preferably between about 40° F. and 60° F.

In another embodiment, the carcass is electrically stimulated and thereafter cooled, such as by blowing relatively cooler air on previously electrically stimulated muscles for a predetermined amount of time. Preferably, the temperature of the air directed at the previously electrically stimulated muscles is from about 0° F. to 65° F., and more preferably from about 40° F. to about 60° F. In this way, the muscles of the carcass do not "overheat" or remain a temperature that increases the likelihood of purge problems. It is understood that generally it is not desirable, however, to chill the carcass to less than 60° F. prior to the completion of rigor mortis.

In one particular embodiment, the present invention comprises a method for selectively electrically stimulating an animal carcass having a midsection, an anterior end section, and a posterior end section. The embodiment enables substantially the entire carcass to be electrically stimulated. However, the muscles of the midsection of the carcass may be electrically stimulated to a greater degree than the muscles of the anterior and/or posterior end sections such that the muscles of the anterior and posterior end sections are electrically stimulated, but are not electrically stimulated to an extent that would cause an undesirable amount of purge in the muscles of the anterior and posterior end sections. In this embodiment, the method comprises:

contacting the midsection of the carcass with at least one first electrical stimulation contact;

contacting the animal carcass with at least one first ground contact above the at least one first electrical stimulation contact;

contacting the animal carcass with at least one second ground contact below the at least one first electrical stimulation contact;

contacting the posterior end section of the animal carcass with at least one second electrical stimulation contact; and contacting the anterior end section of the animal carcass with at least one third electrical stimulation contact.

In one embodiment, a first voltage used to supply electrical current to the at least one first electrical stimulation contact is at least twice that of a second and third voltage used to supply electric current to the at least one second and third electrical stimulation contact respectively. In this way, the muscles of the midsection will be electrically stimulated to a greater degree than the muscles of the anterior and posterior end sections.

In another embodiment, the method further comprises contacting at least one of the anterior end section and the posterior end section with at least one ground electrode to reduce the amount of electrical stimulation provided in the anterior and/or posterior end sections.

Any suitable apparatus known in the art may be modified for the differential and purposeful electrical stimulation of at least a first section and at least a second section of an animal carcass, while allowing at least the first section of the carcass to receive a greater amount of electrical stimulation than at least the at least a second section of the carcass. The apparatus for use in the present invention typically includes a plurality of contacts, a voltmeter in connection with at least one of the contacts, and an amp meter in connection with at least one of the contacts to display or otherwise measure the amount of electrical current being supplied to the desired contact or contacts.

As used herein, the term "contact" refers to any structure capable of contacting a surface of the animal carcass, and preferably a surface of the muscle of the animal carcass. The contact may include any structure that is insertable into the body of the animal carcass, such as a sharpened probe. In addition, the contact may be an elongated rub bar that may selectively contact the animal carcass at some point as the carcass travels past the rub bar. Alternatively, the contact may be any other structure, which can contact a surface of the animal as desired.

In accordance with one aspect of the present invention, there is provided an apparatus for purposefully and differentially electrically stimulating the muscles of at least a first section of an animal carcass to a first degree and the muscles of at least a second section of an animal carcass to a second degree less than the first degree. In one embodiment, the carcass is a whole or split carcass comprising a midsection, a posterior end section, and the apparatus comprises:

at least one first electrical stimulation contact for delivering electric current to the midsection of the carcass to provide electrically stimulated muscles in the midsection of the carcass;

at least one second electrical stimulation contact for delivering electric current to a posterior end section of the carcass to provide electrically stimulated muscles in the posterior end section of the carcass; and at least one third electrical stimulation contact for delivering electric current to an anterior end section of the carcass to provide electrically stimulated muscles in the anterior end section of the carcass.

The apparatus typically further comprises a first ground contact and a second ground contact disposed above and below the at least one first electrical stimulation contact.

In one embodiment, the at least one second electrical stimulation contact is operable to electrically stimulate the muscles of the posterior end section to a lesser degree than the degree to which the muscles of the midsection are electrically stimulated. Similarly, the at least one third electrical stimulation contact is operable to electrically stimulate the muscles of the anterior end section to a lesser degree than the degree to which the muscles of the midsection are electrically stimulated.

In accordance with yet another aspect of the present invention, any of the methods or apparatuses described herein may be modified to electrically stimulate only the anterior end section of the carcass, including the chuck, or alternatively to electrically stimulate only the posterior end section of the carcass, including the round. In another embodiment, the muscles of the anterior end section and posterior end section only are purposefully electrically stimulated while the muscles of the midsection are electrically stimulated, if at all, to a lesser degree.

In accordance with another aspect of the present invention, the tenderness of the meat before and/or after electrical stimulation may be monitored to ensure the targeted section or sections of the carcass are electrically stimulated to the desired extent. For example, after at least one section of the carcass is electrically stimulated, any suitable cutting technique and/or assay may be used to determine whether the muscles have been tenderized to their desired degree. For example, shear testing may be performed on the previously electrically stimulated section to determine whether the desired tenderness has been achieved. If not, the previously electrically stimulated section may be subjected to additional electrical stimulation treatments.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

BRIEF DESCRIPTION OF THE DRAWINGS

The present invention will become apparent upon consideration of the following detailed description of an embodiment thereof, especially when taken in conjunction with the accompanying drawings, wherein.

DETAILED DESCRIPTION OF THE INVENTION

Figure 1:
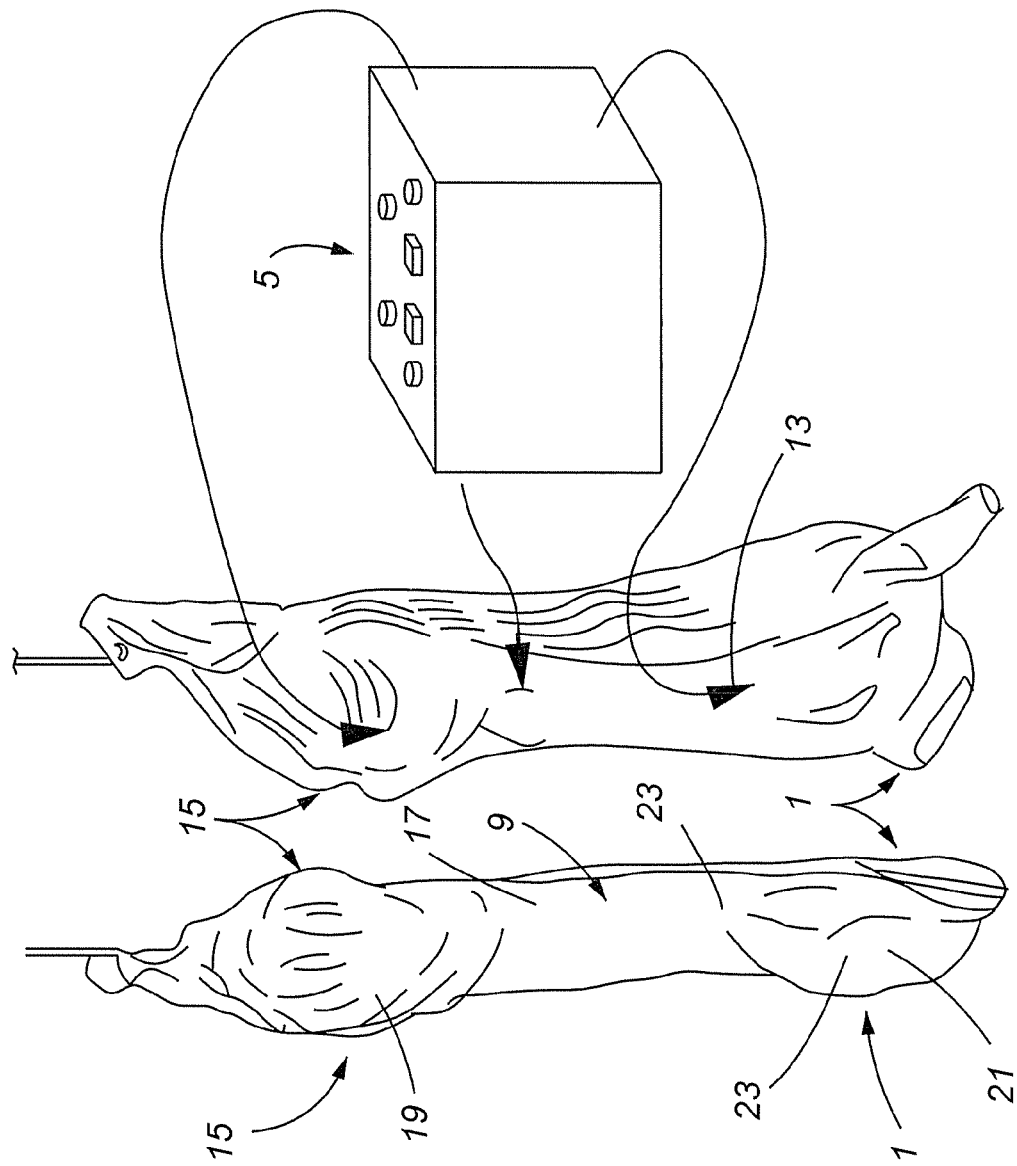
FIG. 1 depicts a prior art electrical stimulation apparatus with a single positive electrode/probe and two ground electrodes/probes.
Figure 2:
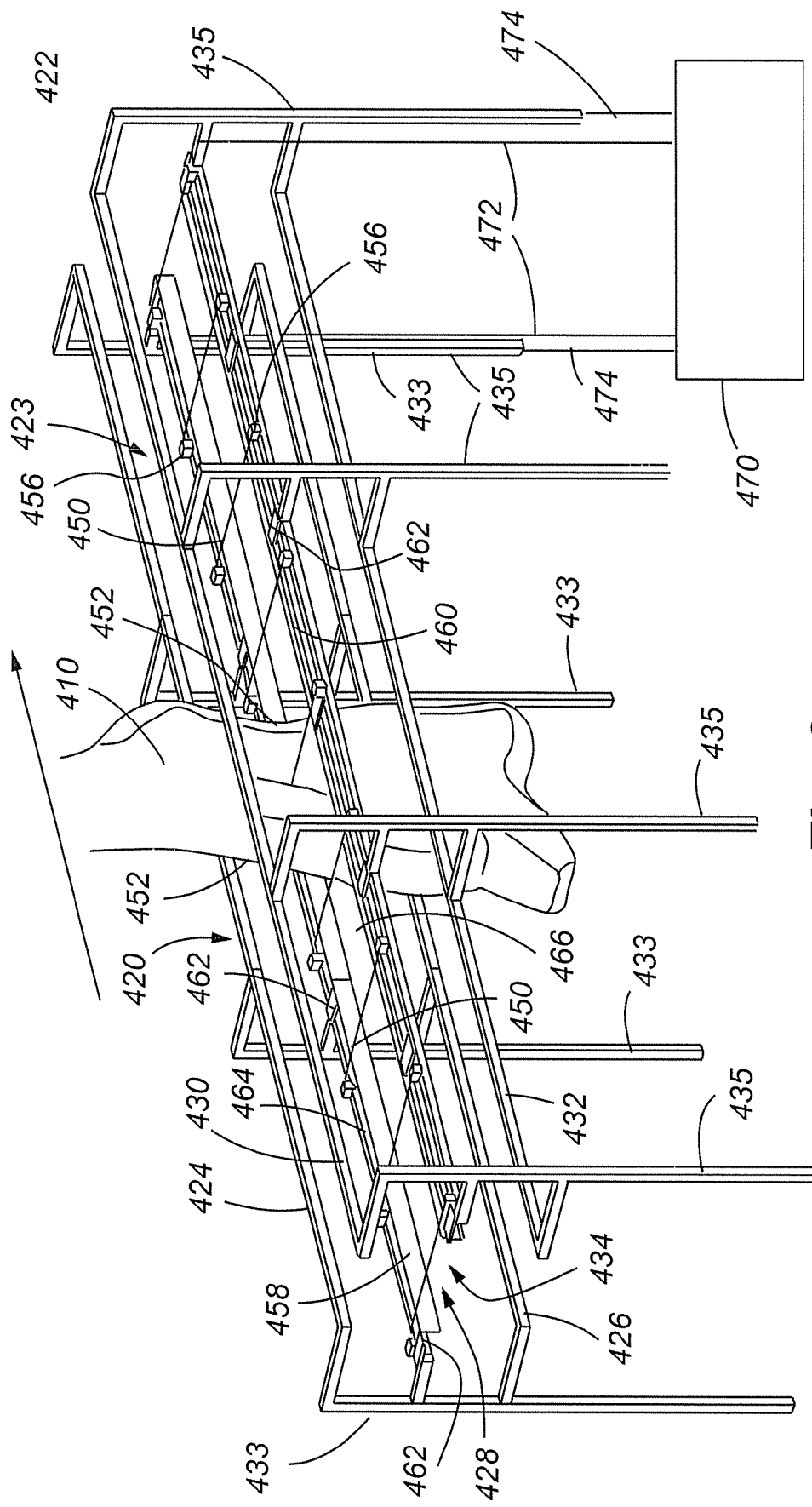
FIG. 2 depicts another embodiment of a prior art electrical stimulation apparatus with two grounds with a plurality of electrical stimulation bars/probes running transverse to the path of travel of a carcass.

The present invention provides for a method and apparatus for tenderizing the meat of an animal carcass without any substantial purge losses in the carcass meat. As used herein, the term "animal carcass" generally refers to the body of an animal after it has been stunned and rendered unconscious or alternatively put to death, such as by exsanguination. Further, as used herein, "animal carcass," includes a whole carcass, substantially all of a whole carcass, a split carcass, or other subdivisions of a carcass.

While a bovine carcass, such as the carcass of a bull, heifer, or cow, or steer carcass is typically used for illustrative purposes herein, it is understood that the present invention is applicable to other animal carcasses, including porcine, ovine, buffalo, deer, elk, and poultry carcasses.

The processing of an animal carcass is generally performed in an assembly line type operation where multiple carcasses are moved and processed along a series of stations. While the following includes a discussion of the processing of a single animal carcass, it should be understood that the processing of an animal carcass as described herein may be applied to a continuous assembly line operation of processing multiple animal carcasses.

Typically, the processing of an animal carcass includes the steps of stunning the animal, bleeding the animal, removing the hide of the animal, eviscerating the animal, and cooling of the animal carcass to a desired temperature. Slaughter plants often have chill capabilities of 24 hours or 48 hours. Those plants with 24-hour capacity must chill rapidly while plants with 48-hour capacity can chill more slowly. The general objective in cooling the animal carcass is to reduce the internal muscle temperatures of the animal carcass to below about 70° F. prior to the onset of rigor mortis. The internal muscle temperature refers to the temperature within a particular muscle. Ideally, the internal muscle temperature should be reduced to the between about 60° F. and 70° F. prior to the onset of rigor, and preferably less than 65° F. If temperatures are above this range when rigor mortis completion occurs, purge problems, including excessive loss of moisture and juices from the meat, may result.

Since it is well known that animals generally enter a meat processing plant with various foreign materials present on their hair, including blood, dirt, manure, mud and vegetative material, and a multitude of microorganisms, some of which are pathogenic to humans, prior to electrically stimulating the carcass, the hide of the animal may be washed or rinsed before cutting and removing the hide to prevent the meat from being contaminated. The hide may be rinsed for an example with a high-pressure spray of an alkaline solution having a pH of from about 8 to about 13 from a plurality of nozzles, and preferably a plurality of movable nozzles. In one embodiment, the alkaline solution is sodium hydroxide. Suitable method, apparatus, and preferred solutions to reduce a number of contaminants on the hide of the animal are disclosed for example, in U.S. Pat. No. 7,022,005, the entirety of which is incorporated by reference. Once the hide is removed and the carcass is split or otherwise divided, if at all, the carcass is ready for further processing, including electrical stimulation to tenderize the meat of the carcass.

Figure 3:
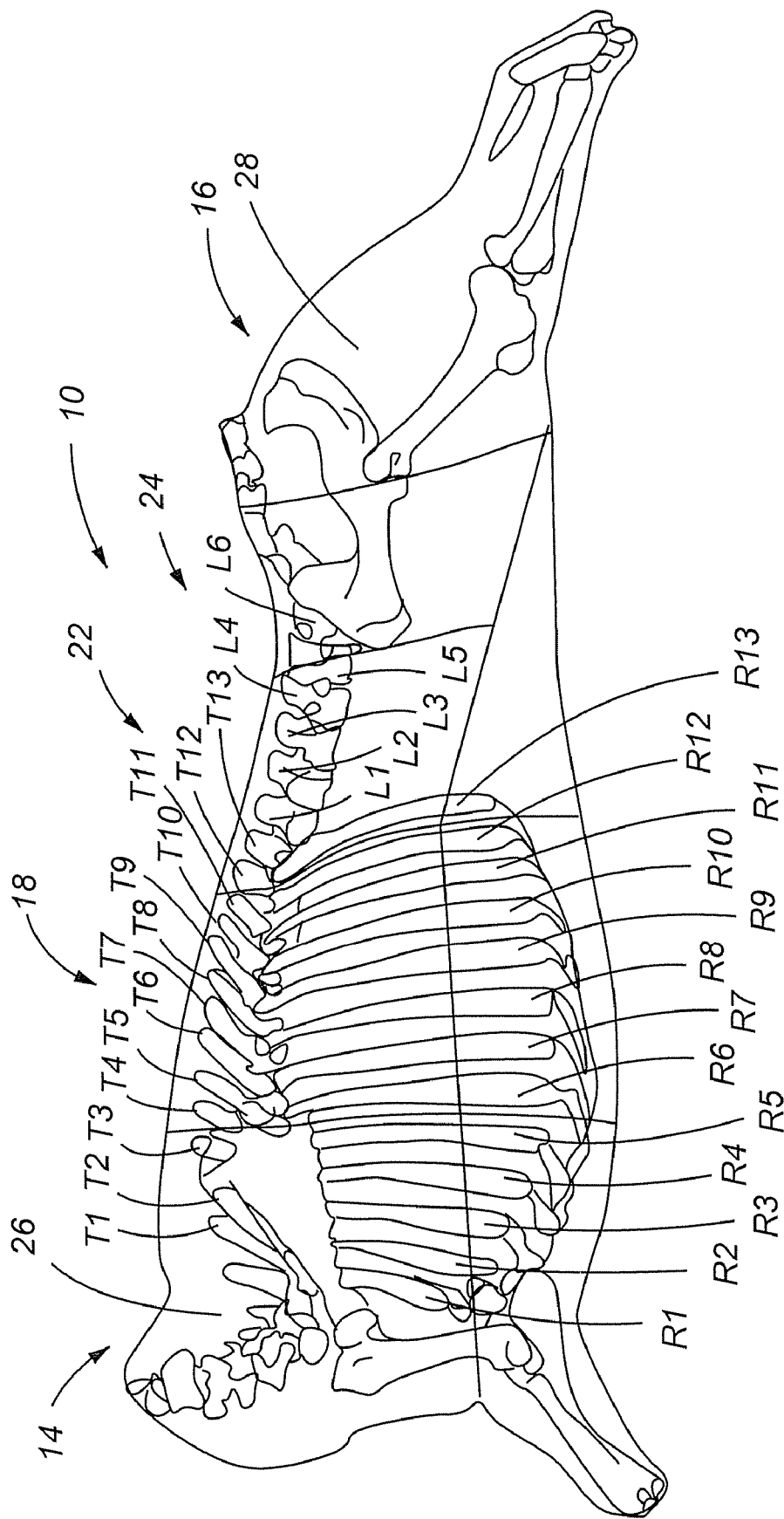
FIG. 3 depicts one of embodiment of a whole bovine carcass in accordance with the present invention.

Now referring to the figures, as shown in FIG. 3, a whole bovine carcass 10 generally includes a midsection 12, an anterior end section 14, and a posterior end section 16. Midsection 12 generally refers to the region of carcass 10 that includes the rib section 18 and the loin (22, 24). More particularly, midsection 12 includes the thinner muscles of rib section 18 and loin 22, 24 that are generally characterized as extending from about between the fifth thoracic vertebrae (T5) and sixth thoracic vertebrae (T6) and about between the fourth sacral vertebrae (S4) and fifth sacral vertebrae (S5). For identification, the thirteen thoracic vertebrae are depicted as T1-T13, the six lumbar vertebrae are depicted as L1-L6, and the five sacral vertebrae are depicted as S1-S5. The thirteen ribs of rib section 18 are depicted as R1-R13.

The loin is generally identified as including a short loin region 22 and a sirloin region 24. Short loin region 22 may extend from about the location of the 13$^{th}$ thoracic vertebrae (T13) and the 1$^{st}$ lumbar vertebrae (L1) to about the location of the 5$^{th}$ lumbar vertebrae (L5). Sirloin region 24 may extend from about the location of the 5$^{th}$ lumbar vertebrae (L5) to about the 4$^{th}$ sacral vertebrae (S4).

Anterior end section 14 of bovine carcass 10 includes the shoulder muscles that the industry refers to as the chuck 26. More particularly, anterior end section 14 generally includes the muscles of carcass 10 extending from about the fifth thoracic vertebrae (T5) and sixth thoracic vertebrae (T6) to the shoulder end of carcass 10.

The posterior end section 16 of the bovine carcass 10 includes the hind limb muscles that are typically referred to as the round 28. More particularly, posterior end section 16 generally includes the muscles of carcass 10 extending from about the fourth sacral vertebrae (S4) and fifth sacral vertebrae (S5) to the hind leg end of carcass 10. Other sections of the bovine carcass include the fore shank, brisket, short plate, and flank, which are generally located on the front side of the carcass.

Figure 4:
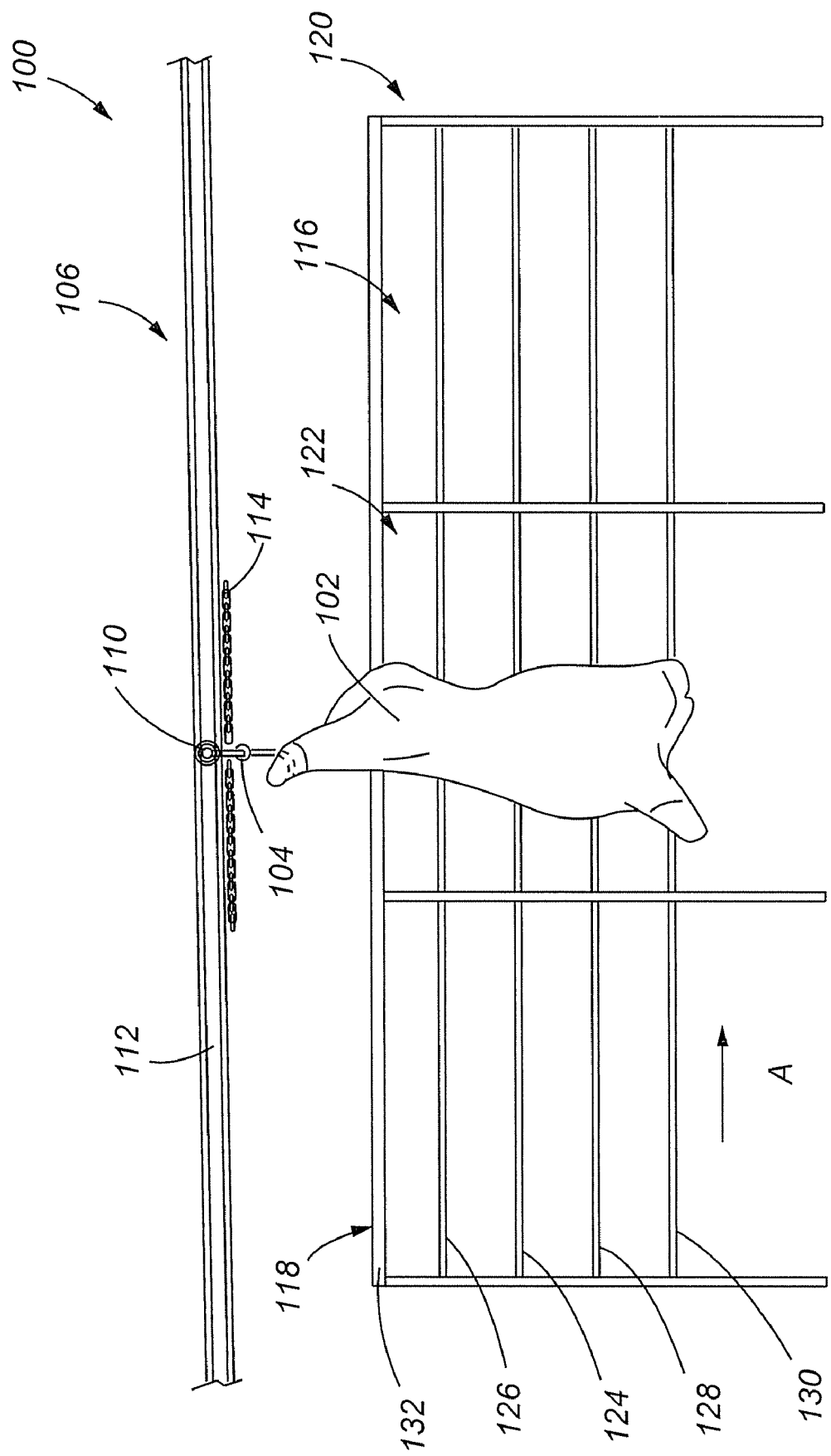
FIG. 4 depicts one embodiment of an electrical stimulation apparatus in accordance with the present invention for purposefully and differentially electrically stimulating the muscles of an entire animal carcass.

Referring to FIG. 4, there is illustrated one embodiment of an electrical stimulation apparatus 100 in accordance with the present invention adapted for purposefully and differentially electrically stimulating the muscles of a plurality of carcasses in an assembly-line operation. As is shown, typically, during processing of the carcass, the animal carcass, i.e. a bovine carcass 102, is hung from the posterior portion of the side from a hanger 104. The hanger 104 can be considered part of a conveyor 106 that conveys animal carcass 102 through animal processing operations. Hanger 104 can be provided in the form of a hook 108. In addition, hanger 104 extends from a trolley 110 that runs along a rail 112. The trolley 110 can be pulled along rail 112 by a chain 114.

Typically, animal carcass 102, and preferably a plurality of animal carcasses, travel through an electrical stimulation frame 116 in the direction of arrow A. Moving in the direction shown by arrow A, animal carcass 102 typically enters electrical stimulation frame 116 at an inlet 118 and exits at an outlet 120. Electrical stimulation apparatus 100 may be constructed such that animal carcass 102 receives a predetermined amount of electrical current as the carcass 102 moves through a length 122 of electrical stimulation frame 116 between the inlet 118 and the outlet 120. Electrical stimulation apparatus 100 is typically set up in a long corridor of a meat processing facility to allow for the processing and electrical stimulation of multiple carcasses.

In this embodiment, frame 116 includes five continuos contacts that may contact a surface of carcass 112 as it travels from inlet 118 to outlet 120. In particular, frame 116 includes a central electrical stimulation bar 124, an upper ground bar 126, a lower ground bar 128, an upper electrical stimulation bar 130, and a lower electrical stimulation bar 132. In this embodiment, each of the electrical stimulation or ground bars is shown in the form of an elongated rub bar that extends parallel to the direction of travel of the carcass, but any suitable structure for contacting the surface of the muscles of the carcass may be used.

Central electrical stimulation bar 124 is typically electrically connected to a voltmeter and power source (not shown) to deliver a predetermined amount of electric current to carcass 102. When the carcass is brought into contact with central electrical stimulation bar 124 by movement of trolley 110, central electrical stimulation bar 124 contacts the animal carcass 102 at about midsection 12 of the carcass, generally at a location corresponding between about the fifth thoracic vertebrae (T5) and sixth thoracic vertebrae (T6) and between about the fourth sacral vertebrae (S4) and fifth sacral vertebrae (S5). Central electrical stimulation bar 124 may deliver an electric current in the form of a direct current, an alternating current, or both, and preferably alternating current.

Central electrical stimulation bar 124 may deliver an electric current in the form of a direct current, an alternating current, or both, and preferably an alternating current. The electric voltage used to supply the electric current to central electrical stimulation bar 124 may be in the range of between about 10 and 3000 volts, and preferably between about 40 and 500 volts. When an alternating current is applied to the carcass, central electrical stimulation bar 124 typically supplies a current to the midsection of the carcass at a frequency between about 40 and 60 Hz. The duration of each application of electric current protocol (from central electrical stimulation bar 124) may be from about 30 seconds to about 3 minutes, and more preferably from about 45 seconds to about 75 seconds, and even more preferably from about 55 seconds to 65 seconds.

Additionally, central electrical stimulation bar 124 may deliver an electrical current to the carcass 102 continuously as the carcass is contacted with central electrical stimulation bar 124, or alternatively can deliver electrical current to carcass 102 in intervals with periods of rest between the delivering of electrical current, such as in intervals of between about 0.5 and about 5 seconds with periods of from about 0.5 to about 5 seconds of reduced application of electric current or complete rest therebetween. Central electrical stimulation bar 124 may deliver as many cycles as desired to electrically stimulate the muscles of the carcass, such as, for example, from about 2 to about 20 cycles of electric current, and preferably from 10 to 12 cycles. Although central electrical stimulation bar 124 is shown in the form of an elongated rub bar, central electrical stimulation bar 124 may alternatively be in the form of any suitable structure that may deliver electric current to the midsection of the carcass.

Although one central electrical stimulation bar 124 is depicted in FIG. 4 to deliver electric current to the midsection of the carcass, it is contemplated that any number of additional electrical stimulation bars may be used to deliver electric current to midsection 12 of carcass 102, and thereby provide electrically stimulated muscles in midsection 12 of carcass 102. Central electrical stimulation bar 124 may deliver as many cycles of electric current as desired to electrically stimulate the muscles of the carcass without causing undue purge problems, such as, for example, from about 2 to about 20 cycles of electric current, and preferably 10 to 12 cycles of electric current.

As shown in FIG. 4, disposed above and below central electrical stimulation bar 124 are upper ground bar 126 and lower ground bar 128. Upper ground bar 124 and lower ground bar 128 are typically positioned so as to enable electric current delivered by central electrical stimulation bar 124 to be focused along at least a midsection of the animal carcass to provide electrically stimulated muscles in midsection 12 of the carcass. Therefore, upper ground bar 126 and lower ground bar 128 contact carcass 102 at a location corresponding to the respective borders of the midsection of the carcass. It is understood that upper ground bar 126 and lower ground bar 128 serve to create a potential difference between the central electrical stimulation bar 124 and each of upper ground bar 126 and lower ground bar 128.

In one embodiment, as shown, upper ground bar 126 contacts the animal carcass at a location corresponding to between about the 5$^{th}$ thoracic vertebrae and about the 11$^{th}$ thoracic vertebrae, such as a location between about the 5$^{th}$ thoracic vertebrae and the 6$^{th}$ thoracic vertebrae, i.e. the separation point between chuck 26 and midsection 12. Lower ground bar 128 may contact carcass 102 at a location corresponding to about the sacral vertebrae of the carcass or therebelow, such as a location corresponding to between about the 4$^{th}$ sacral vertebrae (S4) and 5$^{th}$ sacral vertebrae (S5), i.e. the separation point between round 68 and midsection 12. As with central electrical stimulation bar 124, although one upper ground bar 126 and one lower ground bar 128 are depicted in FIG. 4, it is contemplated that any number of additional ground bars may be used to direct electric current to the midsection of the carcass or a subsection thereof, and thereby provide electrically stimulated muscles in the midsection of the carcass or subsection thereof. Further, although the grounds are illustrated in the form of elongated rub burs, any other suitable stricture or contact may be used to contact the animal carcass.

Disposed above upper ground bar 126 is upper electrical stimulation bar 132. Since central electrical stimulation bar 124, upper ground bar 126, and lower ground bar 128 collectively work to focus electrical current to a midsection of the carcass as shown to provide electrically stimulated muscles in midsection 12 and since upper ground bar 126 collects at least some of the electrical current applied to the midsection, the application of electric current through contact of the carcass in the anterior end section of the carcass with upper electrical stimulation bar 132 enables the muscles in the round, for example, to also be selectively electrically stimulated. It is understood that rail 112 may also serve as a ground for the apparatus and that at least some of the electric current applied through contact of upper electrical stimulation bar 132 with the carcass may travel to rail 112. In this embodiment, the muscles in posterior end section 16 of carcass 102, including round 28, may be electrically stimulated to similar extent or lesser extent than the muscles of the midsection of the carcass, and preferably to a lesser extent than the muscles of the midsection. Generally, upper electrical stimulation bar 132 contacts the carcass in the posterior end section of the carcass, and preferably in the round portion of the carcass to purposefully electrically stimulate the muscles of the round.

Similarly, disposed above lower ground bar 128 is lower electrical stimulation bar 130. Since central electrical stimulation bar 124, upper ground bar 126, and lower ground bar 128 collectively work to apply electrical current to a midsection of the carcass to provide electrically stimulated muscles in midsection 12 and lower ground bar 130 collects at least some of the electrical current applied to the midsection, the application of electric current through contact of the carcass with lower electrical stimulation bar 130 enables the muscles in the anterior end section 14, including the chuck 26, to be electrically stimulated. Generally, lower electrical stimulation bar 130 contacts the carcass in the anterior end section of the carcass, and preferably in the chuck portion of the carcass.

It is contemplated that the muscles in the anterior end section 14, including the chuck 26, may receive less electrical stimulation than the muscles of the midsection. It is further contemplated that the muscles of anterior end section 14 may be electrically stimulated to a substantially identical degree, a similar degree, or a different degree as the muscles of posterior end section 16.

As discussed previously, the amount of electrical stimulation received by any section of the animal carcass may be dependent, in part, on the amount of electric current applied to the carcass, the duration of the application of electric current, the number of cycles of electric current, and the amount of rest, if any, between intervals, for example.

The amount of electrical stimulation received by the muscles of the anterior and/or posterior end sections is typically less than the amount of electrical stimulation that would cause an undesirable amount of purge in muscles of the round section. Either or both of lower electrical stimulation bar 130 and upper electrical stimulation bar 132 may deliver an electric current in the form of a direct current, an alternating current, or both. The electric voltage used to supply electric current to lower electrical stimulation bar 130 and/or upper electrical stimulation bar 132 may be in the range of between about 10 and 3000 volts, and preferably between about 40 and 500 volts. When an alternating current is applied to the carcass, lower electrical stimulation bar 130 and/or upper electrical stimulation bar 132 typically supply a current to the midsection of the carcass at a frequency between about 40 and 60 Hz. The duration of each application of electric current from lower electrical stimulation bar 130 and/or upper electrical stimulation bar 132 may be from about 30 seconds to about 3 minutes, and more preferably from about 45 seconds to about 75 seconds, and even more preferably from about 55 seconds to 65 seconds.

Additionally, either or both of lower electrical stimulation bar 130 and upper electrical stimulation bar 132 may deliver an electrical current to the carcass 102 continuously as the carcass is contacted with bars 130, 132. Alternatively, either or both of lower electrical stimulation bar 130 and upper electrical stimulation bar 132 may deliver electrical current to carcass 102 in intervals with periods of rest between the delivering of electrical current, such as in intervals of between about 0.5 and about 5 seconds with periods of from about 0.5 to about 5 seconds of reduced application of electric current or complete rest therebetween. Bars 130 and 132 may deliver as many cycles as desired to electrically stimulate the muscles of the carcass without causing undue purge problems, such as, for example, from about 2 to about 20 cycles of electric current, and preferably from 10 to 12 cycles. Although lower electrical stimulation bar 130 and upper electrical stimulation bar 132 are shown in the form of an elongated rub bar, bars 130, 132 may alternatively be in the form of any suitable structure that may contact the carcass and deliver an electric current to the anterior and posterior end section of the carcass.

In operation, apparatus 100 may electrically stimulate substantially the entire carcass or the entire carcass. However, the extent of electrical stimulation of the muscles of the anterior end section and posterior end section is controlled such that the muscles of the anterior and posterior end sections receive the benefits of electrical stimulation, but are not electrically stimulated to a degree such that an undesirable amount of purge results in the muscles of the anterior and posterior end sections.

It is contemplated that any further number of electrical stimulation or ground contacts may be added to apparatus 100 as desired to deliver electric current to the midsection, anterior, and/or posterior sections of the carcass to provide a differential amount of electrical stimulation in the carcass. Further, it is contemplated that any of the electrical stimulation bars and ground bars need not be operational at a given point in time, nor contact the carcass if it is desired not to electrically stimulate a particular section of the carcass at any point in time.

In this embodiment, apparatus 100 provides the purposeful stimulation of the muscles of the entire animal carcass while controlling the amount of stimulation received by the sections of the carcass that are most susceptible to purge problems. In this way, the muscles of the anterior and posterior end sections, including the chuck and round respectively, are not electrically stimulated such that the muscles purge excessively as may occur if the muscles of the anterior and posterior end sections are electrically stimulated to the same degree as the middle meats section of the animal carcass. In this way also, the chuck and round sections may receive the benefits of electrical stimulation, i.e. tenderness, without the problems associated with over-stimulating the chuck and round muscles, and by increasing the likelihood that the muscles will not sufficiently cool prior to the onset of rigor mortis.

In the embodiment shown in FIG. 4, frame 116 is depicted as having one side, which includes central electrical stimulation bar 124, upper ground bar 126, lower ground bar 128, upper electrical stimulation bar 132, and lower electrical stimulation bar 130. The bars are all shown as being a continuous bar that extend substantially along an entire distance of frame 116 parallel to the path of travel of the carcass. Typically, the frame 116 is adapted preferably to contact the carcass on a spinal or dorsal side of the carcass as generally the more valuable meat sections of the carcass are located on a dorsal side of the carcass.

Figure 5:
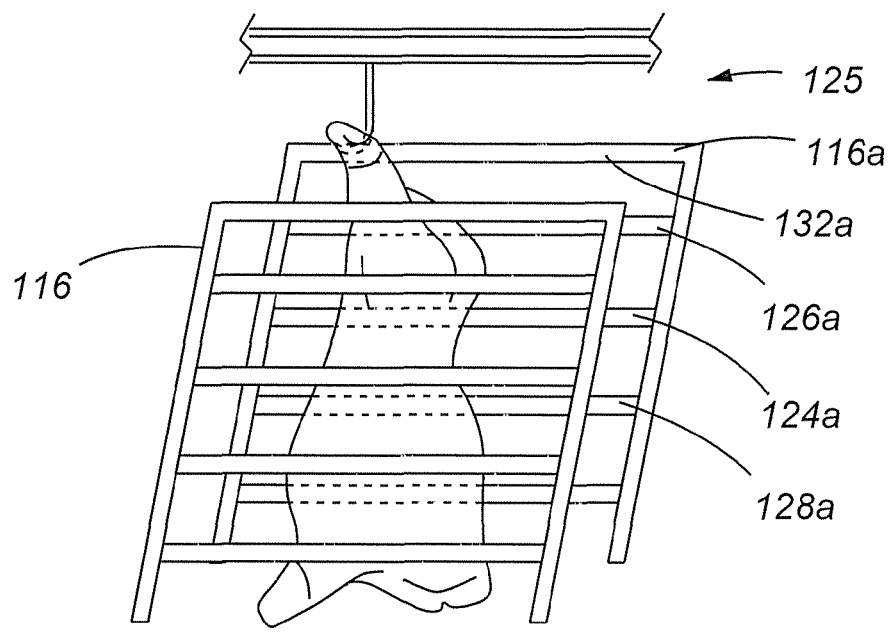
FIG. 5 depicts another embodiment of an electrical stimulation apparatus in accordance with the present invention have a left side frame and a right side frame.

Alternatively, as shown in FIG. 5, an electrical stimulation apparatus 125 may include frame 116 (configured as a left side frame) as described above with respect to FIG. 4 having central electrical stimulation bar 124, an upper ground bar 126, a lower ground bar 128, lower electrical stimulation bar 130, and an upper electrical stimulation bar 132. Additionally, electrical stimulation apparatus 500 may further include a right side frame 116a opposed to frame 116 having a similar central electrical stimulation bar 124a, an upper ground bar 126a, a lower ground bar 128a, and an upper electrical stimulation bar 132a. As carcass 102 travels to the location of the apparatus 125, carcass may one or both of the electrical stimulation and grounds contacts on one or both of the left side and right side frame depending on the orientation of the carcass as it travels through apparatus 125 and whether the carcass is caused to twist, jump, or move away either side frame due to the rapid contraction of the stimulated muscles. When the latter occurs, by having a second frame opposed to a first frame, the carcass is more likely to maintain in contact with the electrical stimulation bar and ground contacts of at least one of the side frame members. Preferably, the electrical stimulation and ground contacts contact the carcass on a dorsal side of the carcass. In this embodiment, electrical stimulation may be applied in any manner described above to provide electrical stimulated muscles to at least one section of the carcass.

In another embodiment, the present invention provides a structural method of applying electric current to a carcass to allow the muscles to relax and/or begin to relax between applications of electric current while maintaining relatively continuous movement of the carcass through the processing facility. This is especially desirable, as it is well known that speed is of the essence in meat processing facilities.

Figure 6:
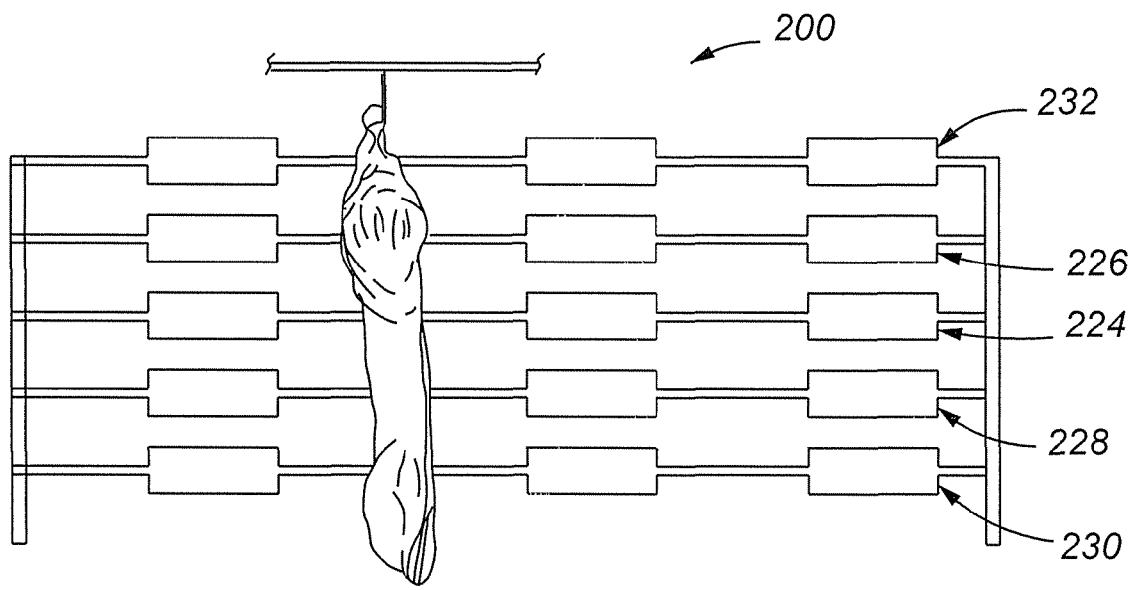
FIG. 6 depicts yet another embodiment of an electrical stimulation apparatus in accordance with the present invention having segmented electrical stimulation and ground contacts.

For example, as shown in FIG. 6, the electrical stimulation and ground rub bars of the apparatus 200 shown are not continuous, but are instead are provided as segmented contacts secured to a frame by any suitable structure. In particular, central electrical stimulation bar 224 is provided as a segmented electrical stimulation bar. Further, as shown, each of lower electrical stimulation bar 230 and upper electrical stimulation bar 232 may be segmented along a length of frame 216. In this way, there is provided a structural method for providing an interval between applications of electric current to the carcass. Upper ground contact 226 and lower ground contact 228 may be in the form of a continuous bar as shown, a segmented bar, or any other suitable structure that may contact the carcass. The amount of spacing between successive segments is dependent on the duration of the interval desired. The speed of travel past central electrical stimulation bar 224, upper ground contact 226, lower ground contact 228, lower electrical stimulation bar 230, and upper electrical stimulation bar 232 may also be adjusted to lengthen or shorten the interval between applications of electric current as desired. In one embodiment, one or more segments of central electrical stimulation bar 224 has at least a portion which lies in the same vertical plane as one or more segments of lower electrical stimulation bar 232 and upper electrical stimulation bar 230.

Figure 7:
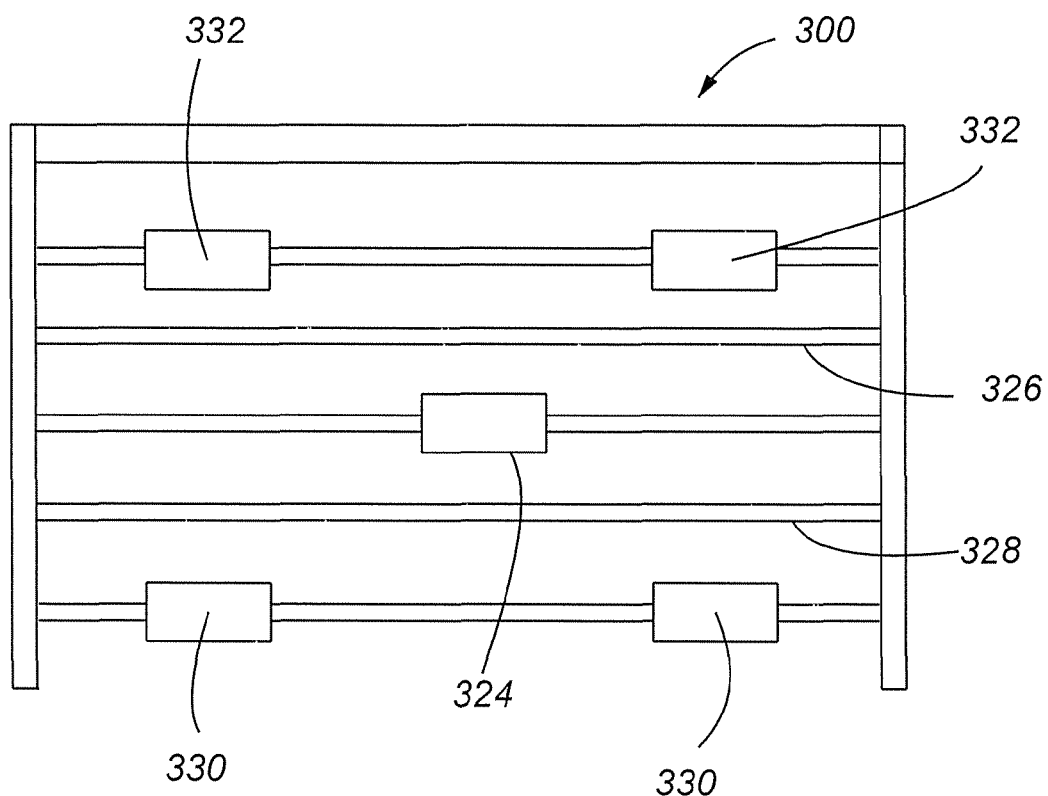
FIG. 7 depicts still another embodiment of an electrical stimulation apparatus in accordance with the present invention having segmented electrical stimulation and ground contacts.

Alternatively, as shown in FIG. 7, the segments of each electrical stimulation and ground contact (if segmented) may be spaced apart as desired on a vertical plane so that one section of the carcass is not electrically stimulated as intended at the same point in time as another section of the carcass. As shown, apparatus 300 includes central electrical stimulation bar 324 having spaced apart segments 324 secured to a frame by any suitable structure. Upper ground bar 326 and lower ground bar 328 are in the form of a continuous rub bar secured to a frame by any suitable structure. Upper electrical stimulation bar has segments 332, none of which lie in the same vertical plane as segments 324 of central electrical stimulation bar 324. Similarly, lower electrical stimulation bar has segments 330, none of which lie in the same vertical plane as segments 324 of central electrical stimulation bar. Segments 330 and 332 may lie in the same vertical plane as one another respectively as shown, or alternatively may also lie in a different vertical plane.

As mentioned above, it is known that the application of electric current to the carcass to provide electrically stimulated muscles in the carcass may cause the carcass to twist and jump in a direction away from the contacts, i.e. the electrical stimulation bars and ground bars. Moreover, it known that it is typically desirable to provide electrical stimulation to the dorsal side of the carcass as the dorsal side of the carcass includes the valuable meat sections. Accordingly, in one aspect of the present invention, there is provided a device for maintaining the one or more carcasses to be processed in an alignment such that the dorsal side of the carcass is contacted by at least one set of electrical stimulation contacts and ground contacts. The device for maintaining alignment may be any suitable structure, such as a mechanical arm. The device is particularly useful when the electrical stimulation apparatus includes only a single side frame, i.e. frame 116, as illustrated in FIG. 4.

Figure 8:
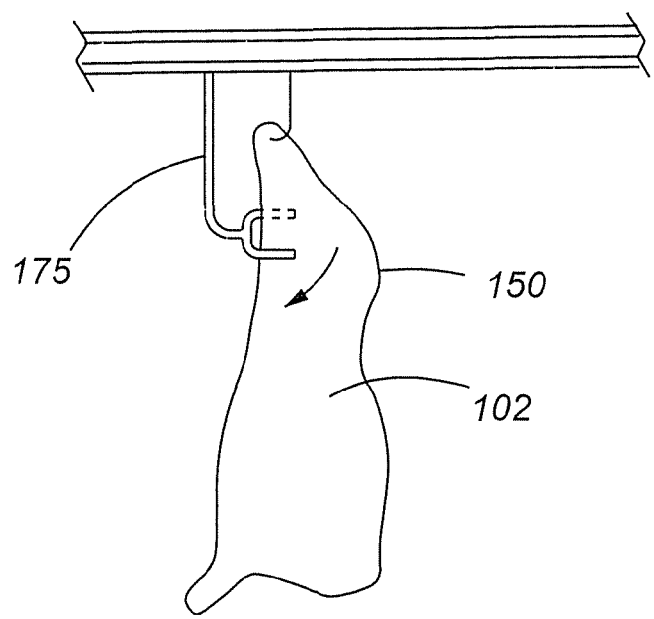
FIG. 8 depicts a device for reorientating an animal carcass such that the dorsal side of the carcass is electrically stimulated in accordance with the present invention.

As shown in FIG. 4, for example, when the carcass is contacted by central electrical stimulation bar 124, upper ground bar 126, lower ground bar 128, lower electrical stimulation bar 130, and upper electrical stimulation bar 132 at a dorsal side 150 of carcass 102, and the carcass twists or jumps such that the dorsal side of the carcass no longer is in contact with any of bars 124, 126, 128, 130, and 132, a device, such as a mechanical arm 175, as shown in FIG. 8, may grasp or cause a portion of carcass 102 to be realigned such that bars 124, 126, 128, 130, and 132 contact carcass 102 at a dorsal side 150 of carcass 102. Alternatively, any other suitable structure or device for aligning the carcass such that electric current is delivered to a dorsal side of the carcass may be used. In addition, it is contemplated that any embodiment of an electrical stimulation apparatus as disclosed herein may further include a photosensor (not shown) in communication with the device (i.e. mechanical arm 175) for determining when a particular carcass is out of alignment. The photosensor may communicate with the device by any known method or structure to instruct the device to correct the alignment of the carcass.

However, alternatively, it may be desirable to apply electric current to the front side of the carcass or alternate between contacting the carcass on the dorsal side of the carcass and the front side of the carcass so as to reduce the amount of electrical stimulation brought about in the muscles on the dorsal side of the carcass. Any suitable device may similarly be used to orient the carcass such that the contacts contact the carcass on a front side thereof, as is desired.

In another aspect of the present invention, in any of the embodiments described herein, it is contemplated that any one or more of the electrical stimulation contacts or grounds contacts may be moved into a position to contact the carcass as the carcass travels past the particular bar. In this way, the position of any or all of the electrical stimulation contacts and ground contacts can be individualized for each individual carcass such that the carcass is electrically stimulated in the optimal location depending on the physical characteristics, i.e. size of the carcass. This is particularly useful since it is well known that carcasses may be of different weights, sizes and shapes.

When, for example, a segmented or continuous rub bar is provided that extends a length of a corridor, the rub bar is fixed and thus has no way of discriminating between carcasses of different sizes. Thus, it may be impossible for upper ground bar 126, for example, to contact two carcasses of notably different lengths at a location about the $4^{th}$ and $5^{th}$ sacral vertebrae. Accordingly, in one aspect of the present invention, as the carcass desired to be stimulated is moved past the electrical stimulation and ground contacts, any one or more of the electrical stimulation or ground contacts, such as electrical stimulation bars, can be moved up, down, left, or right, or therebetween, to contact the carcass. Further, any contact in the present invention can be selectively moved inward and outward as is necessary to optimally contact the carcass at a desired location.

Figure 9:
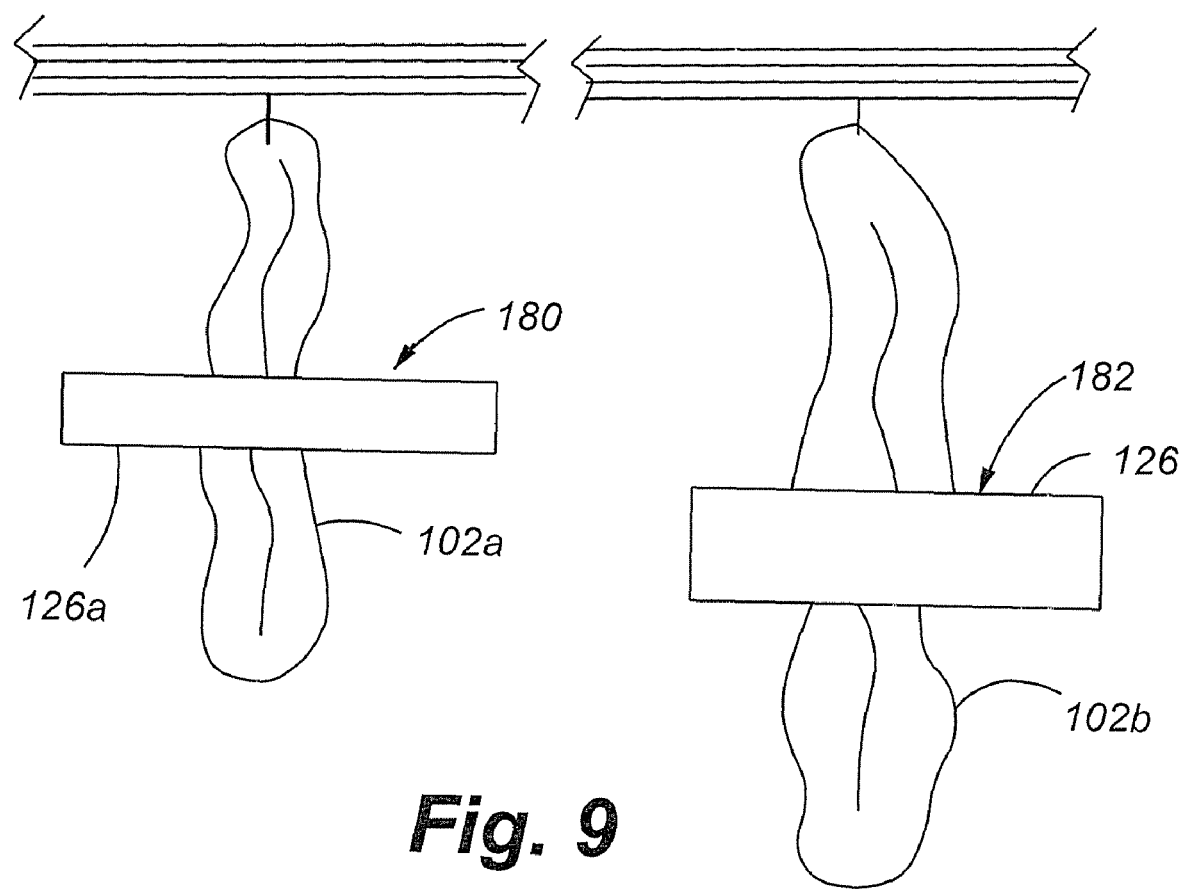
FIG. 9 depicts another embodiment of an electrical stimulation apparatus in accordance with the present invention having a vertically movable/adjustable electrical stimulation bar.

As shown in FIG. 9, for example, upper ground bar 126 (shown in isolation) may be lowered from a first location 180 where the ground bar 126 contacts a first carcass 102a at a location corresponding to about the $4^{th}$ and $5^{th}$ sacral vertebrae to a second location 182 where the ground bar 126 contacts a second carcass 102b at a location corresponding to about the $4^{th}$ and $5^{th}$ sacral vertebrae to account for the longer length of the second carcass. It is contemplated that any of the other contacts may individually remain stationary or move up, down, left, or right, or therebetween, and inward or outward to contact the carcass. In one embodiment, all of the contacts move collectively as unit up, down, left, or right, or therebetween, and inward or outward to contact the carcass in a desired location. In one embodiment, any suitable sensor known in the art may be used to automatically determine a size, shape, or other physical characteristic of the carcass, such as a VerifEYE Carcass Inspection System, supplied by eMerge Interactive, Inc. In another embodiment, the size, shape, or other physical characteristics of the carcass are determined manually, such as by an operator, who can then adjust a position of any one or more electrical stimulation or ground contacts, such as contacts 124, 126, 128, 130, and 132.

Moreover, as well as the positions of the electrical stimulation and ground contacts, it may be desirable to adjust the amount of electric current for one or more of a plurality of carcasses based upon physical characteristics of the carcass. For example, it may be desirable to electrically stimulate a carcass having greater size and weight for a longer duration than a lighter and small carcass. In one embodiment, therefore, the duration of electrical stimulation, the number of cycles of electric current, and the time between successive applications of electric current may be shortened or lengthened based upon the size and/or weight of the carcass.

It is contemplated that more than one any of the electrical stimulation apparatuses disclosed herein may be provided in series to provide a longer electrical stimulation protocol to the carcass. For example, two or more of apparatus 100 may be linked together to further selectively electrically stimulate the muscles of the carcass.

The electrical stimulation and ground contacts of the present invention provide selectively electrical stimulated muscles in the body of a carcass. The contacts may be of any suitable structure for delivering electrical current or providing a ground or negative electrode for electric current delivered to the carcass, such as the rub bars illustrated. In a further embodiment, the contacts may be in the form of stakes that are insertable into the muscles of the carcass. In the case of electrical stimulation probes that are stakes, the stakes are embedded into the carcass, and preferably the muscle of the carcass.

Figure 10:
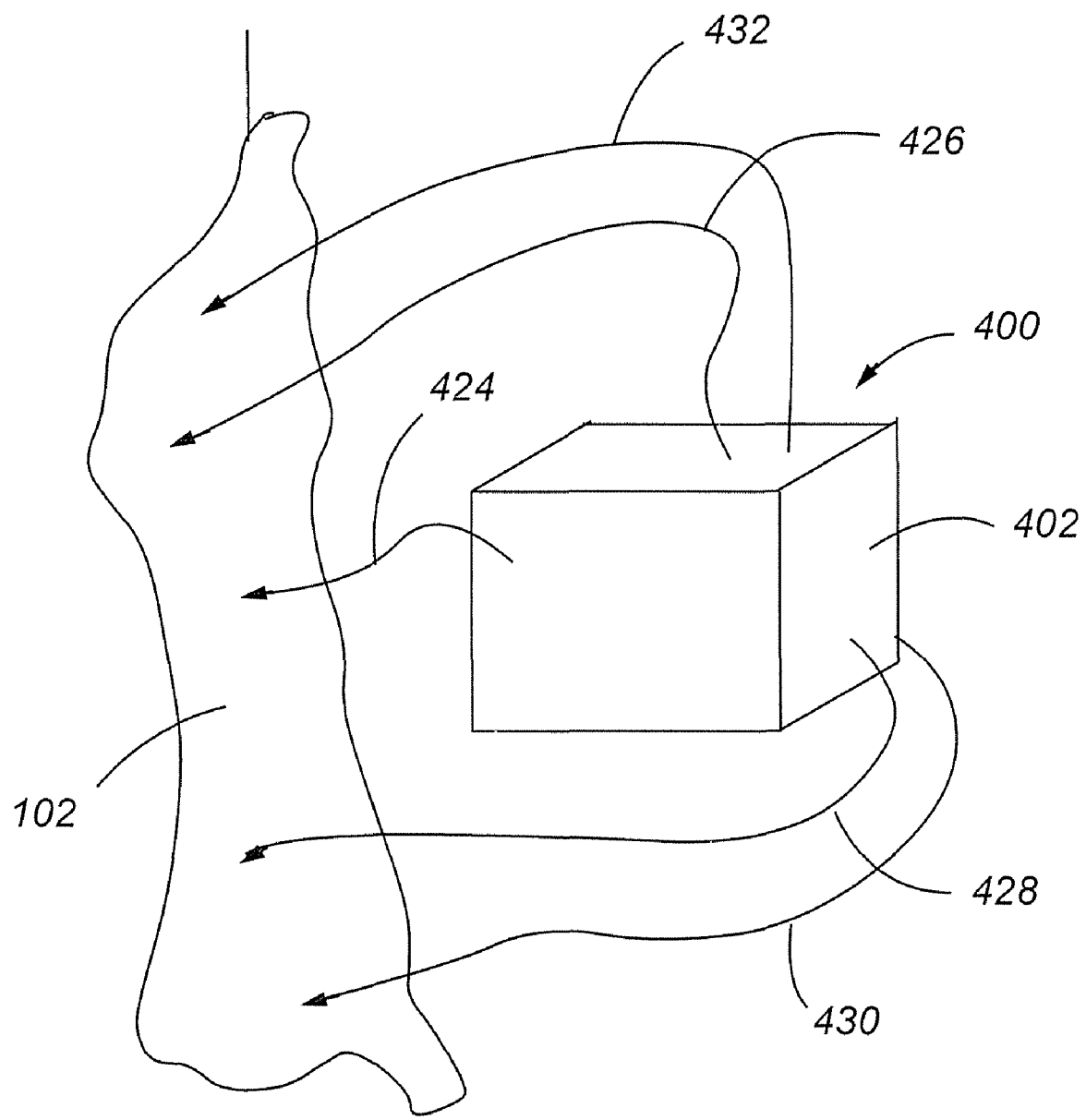
FIG. 10 depicts another embodiment of an electrical stimulation apparatus in accordance with the present invention having insertable electrical stimulation and ground stakes.

Referring to FIG. 10, there is shown an apparatus 400 for differentially and purposefully electrically stimulating a carcass having a housing 402, a central electrical stimulation stake 424, an upper ground stake 426, a lower ground stake 428, an upper electrical stimulation stake 432, and a lower electrical stimulation stake 430. The electrical stimulation stakes 424, 430, and 432 are typically electrically connected to housing 402 by wires. Ground stakes 426 and 428 are electrically connected to the housing 401 by a wire. Electrical stimulation and ground stakes may be connected to any suitable power source.

In operation, apparatus 400 electrically stimulates an isolated area of an animal carcass by inserting central electrical stimulation stake 424, upper electrical stimulation stake 426, and lower electrical stimulation stake 430, and the pair of ground stakes 426 and 428 into the muscles of the carcass 102 in the manner shown. Central electrical stimulation stake 424, upper electrical stimulation stake 432, and lower electrical stimulation stake 430, and the pair of ground stakes 426 and 428 to carcass 102 electrically stimulate at least substantially all the muscles of entire animal carcass, and preferably electrically stimulate all the muscles of the carcass. However, the apparatus may be configured such that the muscles of the anterior end section and/or the posterior end section receive, in comparison, a lesser amount of electrical stimulation than the midsection of the carcass.

In one embodiment, upper ground stake 426 is preferably inserted into the muscles of the carcass in the vicinity of the fourth or fifth sacral vertebrae, which corresponds to about the separation point of the carcass loin and round sections. Lower ground stake 428 is preferably inserted into the muscles of the carcass in the vicinity of the fifth and sixth thoracic vertebrae, which corresponds to about the separation point of the chuck and rib section. Central electrical stimulation stake 424 is preferably inserted into the carcass between a location corresponding to the $5^{th}$ and $6^{th}$ thoracic vertebrae and to about the $4^{th}$ and $5^{th}$ sacral vertebrae. In one embodiment, central electrical stimulation stake 424 is inserted in the vicinity of the fourth and fifth lumbar vertebrae, which corresponds to about the separation point of the top loin and sirloin sections of the carcass. Tipper electrical stimulation stake 432 is inserted in the anterior end section of the carcass, and preferably in a portion of the chuck section of the carcass. Lower electrical stimulation stake 430 is inserted in the posterior end section of the carcass, and preferably in a portion of the round section of the carcass.

During operation of the apparatus 400, current typically flows from central electrical stimulation stake 424 through the midsection of the carcass to upper ground stake 426 and flows from central electrical stimulation stake 424 through the midsection of the carcass to lower ground stake 428. In the same way, current typically flows from upper electrical stimulation stake 432 through the round of the carcass to upper ground stake 426. Current may also flow from lower electrical stimulation stake 430 through the chuck of the carcass to lower ground stake 428. Current flow through each of the sections of the carcass causes the muscles in the carcass to go through relaxation and contraction, thereby causing an acceleration of the rigor mortis and faster decrease of pH in the carcass meat.

The apparatus allows for the electrical stimulation of substantially the entire animal carcass. However, as discussed herein, a different amount of electrical stimulation may be applied to the chuck and/or round sections relative to the midsection of the carcass. It is known that the thicker muscles of the chuck and round will likely take longer to cool than the muscles of the midsection. However, since it is still desirable to electrically stimulate the muscles of the chuck and/or round, apparatus 400 can electrically stimulate the muscles of the midsection to a first degree and the muscles of the chuck and/or round sections to a second degree, preferably less than the first degree. In another embodiment, the muscles of one of the chuck or round can be electrically stimulated to a greater degree than the other of the chuck or round Alternatively, any other section of the carcass can be purposefully electrically stimulated to a greater extent than at least one other purposefully electrically stimulated section of the animal carcass. Further or alternatively, in one embodiment, central electrical stimulation stake 424 delivers an electric current of a higher voltage to carcass 102 than either or both of upper electrical stimulation stake 432 and lower electrical stimulation stake 430.

In another embodiment, the duration of application of the electric current from any or more of electrical stimulation stakes can be varied to effect a different amount of electrical stimulation in the muscles of one section of the carcass, the carcass relative to another section of the carcass. In another embodiment, the electric current may be applied to at least a first section of the carcass and to at least a second section for the same durations. However, the time period of rest or reduced current between applications of electric current may be for a shorter time period in at least a first section of the carcass as compared to the time period of rest or reduced current between applications of electric current in at least a second section of the carcass.

In another embodiment, electric current may be applied to at least a first section of the carcass and to at least a second section of the carcass at different points in time. In still another embodiment, electric current may be applied to at least one section the carcass in increasingly intense or decreasingly amounts of electric current while another at least one section of the carcass has a different electrical stimulation protocol.

In still another embodiment of the present invention, though less preferred, the electrical stimulation and ground contacts may be electrical stimulation probes that extend into the path of travel of the carcass or carcasses as the carcasses are conveyed by a rail, such as rail 116 of FIG. 4. In this way, as an animal carcass moves in the direction shown by arrow A of FIG. 4, the carcass contacts each of the plurality of electrical stimulation probes. The contact between carcass and each of the electrical stimulation probes is for a period of time which varies depending upon the speed of the carcass along the animal carcass traveling path, the length of each electrical stimulation probe, and the size of the animal carcass.

A suitable electrical stimulation apparatus having such probes extending into the path of travel of the carcass or carcasses is set forth in U.S. Pat. Nos. 6,290,592 and 6,364,759, the entirety of which are incorporated by reference. Typically, when these probes are used, the apparatus includes a left side frame and a right side frame and the probes extend outwardly from each of the left side frame and right side frame. It is contemplated that any of the electrical stimulation or ground contacts disclosed herein may be in the form of probes that extend into the path of travel of the carcass as set forth in U.S. Pat. Nos. 6,290,592 and 6,364,759.

Figure 11:
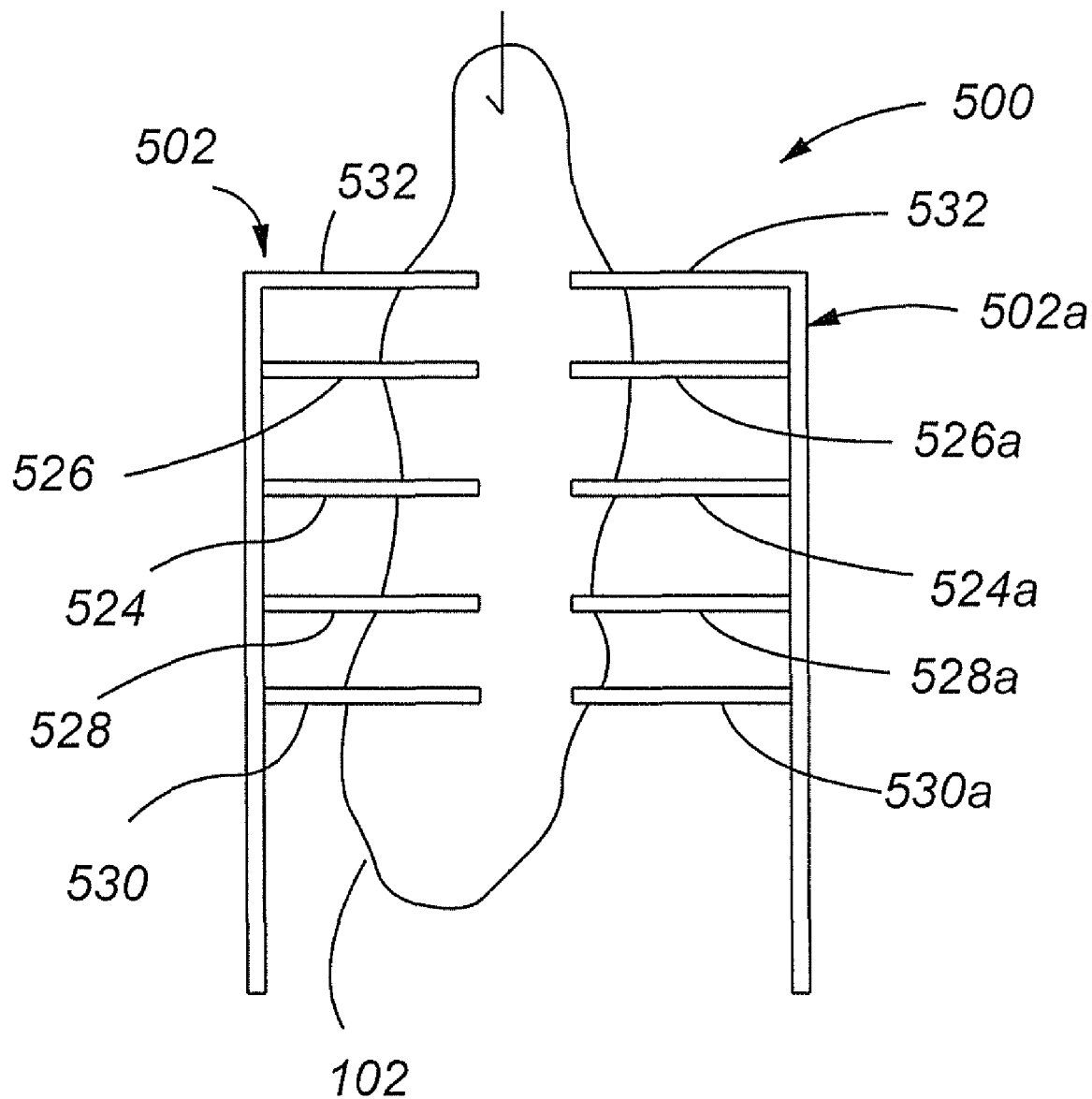
FIG. 11 depicts another embodiment of an electrical stimulation apparatus in accordance with the present invention having electrical stimulation and ground probes which extend into the path of travel of the carcass.

Referring to FIG. 11, in one embodiment, electrical stimulation apparatus 500 includes a left side frame and a right side frame. Left side frame 502 includes a plurality of central electrical stimulation probes 528 provided between upper ground probes 526 and lower ground probes 528, a plurality of lower electrical stimulation probes 530, and a plurality of upper electrical stimulation probes 532. Right side frame 502a includes an upper ground bar 526a, a lower ground 528a, a plurality of central electrical stimulation probes 528a provided between the upper ground 526a and the lower ground 528a, a plurality of lower electrical stimulation probes 530a, and a plurality of upper electrical stimulation probes 532a. Alternatively, any of central electrical stimulation probes, upper electrical stimulation probes, lower electrical stimulation probes, upper ground probes, or lower ground probes may be in the form of an elongated rub bar or any other suitable structure for applying electric current to a particular section of the carcass by contact with the carcass. Additionally, it is contemplated that any further number of electrical stimulation probes may be provided. For example, additional rows of probes may be provided to contact the animal carcass in any desired section.

Upper stimulation probes 532, 532a preferably contact the carcass in a region corresponding to the round of the animal carcass while the lower stimulation probes 530, 530a preferably contact the carcass in a region corresponding to the chuck section of the animal carcass. Central stimulation probes 524, 524a preferably contact the carcass in a midsection of the carcass. In one embodiment, upper ground probes 526, 526a contact carcass 102 in the general region of the fifth and sixth sacral vertebrae, and that the lower ground probes 528, 528a contact the carcass 410 in the general region of the fifth and sixth thoracic vertebrae.

Preferably, the electrical stimulation or ground probes generally extend at an angle of between about 50 degrees and about 130 degrees, and preferably 90 degrees, from an axis extending along the animal carcass traveling path past the length of the left or right electrical stimulation frame. In one embodiment, electrical stimulation and ground probes 526, 526a, 530, 530a, 532, 532a are preferably provided so they bend allowing the carcass 102 to move through the animal carcass traveling path. As the carcass 102 moves along the animal carcass traveling path, each electrical stimulation probe 524, 524a, 526, 526a, 528, 528a, 530, 530a, 532, 532a sequentially contacts an exterior surface of carcass 506 and maintains contact with the exterior surface until carcass 506 is no longer in contact with the particular electrical stimulation probe. The electrical stimulation probes may alternatively be relatively rigid and provided with a spring to enable movement of the probe out of the way of carcass 506.

A power source is typically provided for providing electric current to the electrical stimulation probes and to the ground probes. The plurality of electrical stimulation probes are preferably constructed to provide periods of electrical stimulation and periods of no electrical stimulation as the animal carcass 102 moves through the electrical stimulation frame 412. Generally, it is desirable to include rest intervals so that the targeted muscles can relax between periods of electrical stimulation. Typically, it is desirable for the rest interval to be sufficient so that the animal carcass regains at least about 90% of its original length. During the electrical stimulation, the animal carcass can shorten in its original length by about 40%. Much of this shortening is the result of the muscles contracting and the vertebrae curving.

In any of the embodiments disclosed herein, including the above embodiments, the electrical stimulation protocol can be maintained for at least about thirty seconds or for any other duration in order to deplete the targeted muscles and accelerate the rigor mortis process. Preferably, the electrical stimulation protocol is conducted by multiple periods of electrical stimulation.

In addition, in any of the embodiments described herein, the voltage of the electric current is preferably sufficiently high so that a desired percentage of muscle fibers in the carcass contract. In one embodiment, all of the muscle fibers of the carcass contract to a degree. It is appreciated that once all the muscle fibers are contracted, the additional application of electric current to the carcass may cause excess heating of the muscle that can cause undesirable PSE characteristics, such as purge in the muscles. In one embodiment, the electrical stimulation protocol includes alternating periods of stimulation and rest. In a particular embodiment, the applications or cycles of electric current are for between about one second and about five seconds, and more preferably between about 2 seconds and about 3 seconds. The periods of rest or reduced current may be between applications about 0.5 seconds and about three seconds in this embodiment. In another embodiment, the electrical stimulation protocol can be conducted for sixty seconds including alternating periods of two seconds of electrical stimulation and one second of rest or reduced current.

It is contemplated that in certain embodiments of the present invention, any one section of an animal carcass can be stimulated to a greater degree than any other section of the carcass. Although some of the above embodiments show an embodiment having a first electrical stimulation contact that causes electrical stimulation to be delivered to a midsection of the carcass, a second electrical stimulation contact that causes electrical stimulation to be delivered to the anterior end section of the carcass, including the chuck, a third electrical stimulation contact that causes electrical stimulation to be delivered to the posterior end section of the carcass, including the round, a ground that contacts the carcass between the first and second electrical stimulation contacts, and a ground that contacts the carcass between the first and third electrical stimulation, it is understood any other configuration of positive and negative or ground electrodes may be employed that causes at least one section of the carcass to be electrically stimulated to a different degree to the degree to which at least a second section of the carcass is electrically stimulated.

In the embodiment shown for example in FIG. 4, electrical stimulation bar 124 creates a voltage difference that results in the delivery of a greater amount of electrical current than either of lower electrical stimulation bar 130 and upper electrical stimulation bar 132. Referring to FIG. 4 for illustration purposes, it can be readily be seen that electrical current delivered by central electrical stimulation bar 124 can flow either to either of upper ground bar 126 or lower ground bar 128. It is understood that this split of the electrical current is not necessarily symmetrical to the upper ground bar and lower ground bar 128. At the same time, current being delivered by lower electrical stimulation bar 130 has comparatively one ground bar (ground bar 128) to which current will flow. Further, current delivered by upper electrical stimulation bar 132 may have two grounds to which current will flow, one being the rail 112 (if a rail is used) and the other being upper ground bar 126. Alternatively, if a rail is not provided, current may have one ground to which current may flow, namely upper ground bar 126.

In one embodiment, assuming the carcass is conveyed on a rail 112 as shown in FIG. 4, central electrical stimulation bar 124 creates a voltage that is at least 1.5 times, and preferably from about 1.5 to about 4 times, the voltage created by lower stimulation bar 130. In addition, central electrical stimulation bar 124 may create a voltage that is from about 0.75 to 1.5 times, and preferably 1-1.5 times the voltage created by upper electrical stimulation bar 132. In this way, a greater amount of electrical current will be delivered to the midsection to electrically stimulate the muscles of the midsection to a greater degree than the muscles of the anterior and posterior end sections of the carcass.

When no rail is used, as in the embodiment wherein the contacts are in the form of electrical stimulation stakes, i.e. as shown in FIG. 4 for example, it is contemplated that the central electrical stimulation bar 124 may create a voltage potential that is at least 1.5 times, and preferably 2-5 times, the voltage created by upper electrical stimulation bar 132 and lower electrical stimulation bar 130. Since the electric current delivered to the midsection may be split and directed to either of two grounds (whereas the current directed to the anterior and posterior end sections will flow only to one ground), it may be necessary to create at least twice the voltage potential in the midsection area to electrically stimulate the muscles of the midsection to a greater degree than the muscles of the anterior and posterior end sections.

Figure 12:
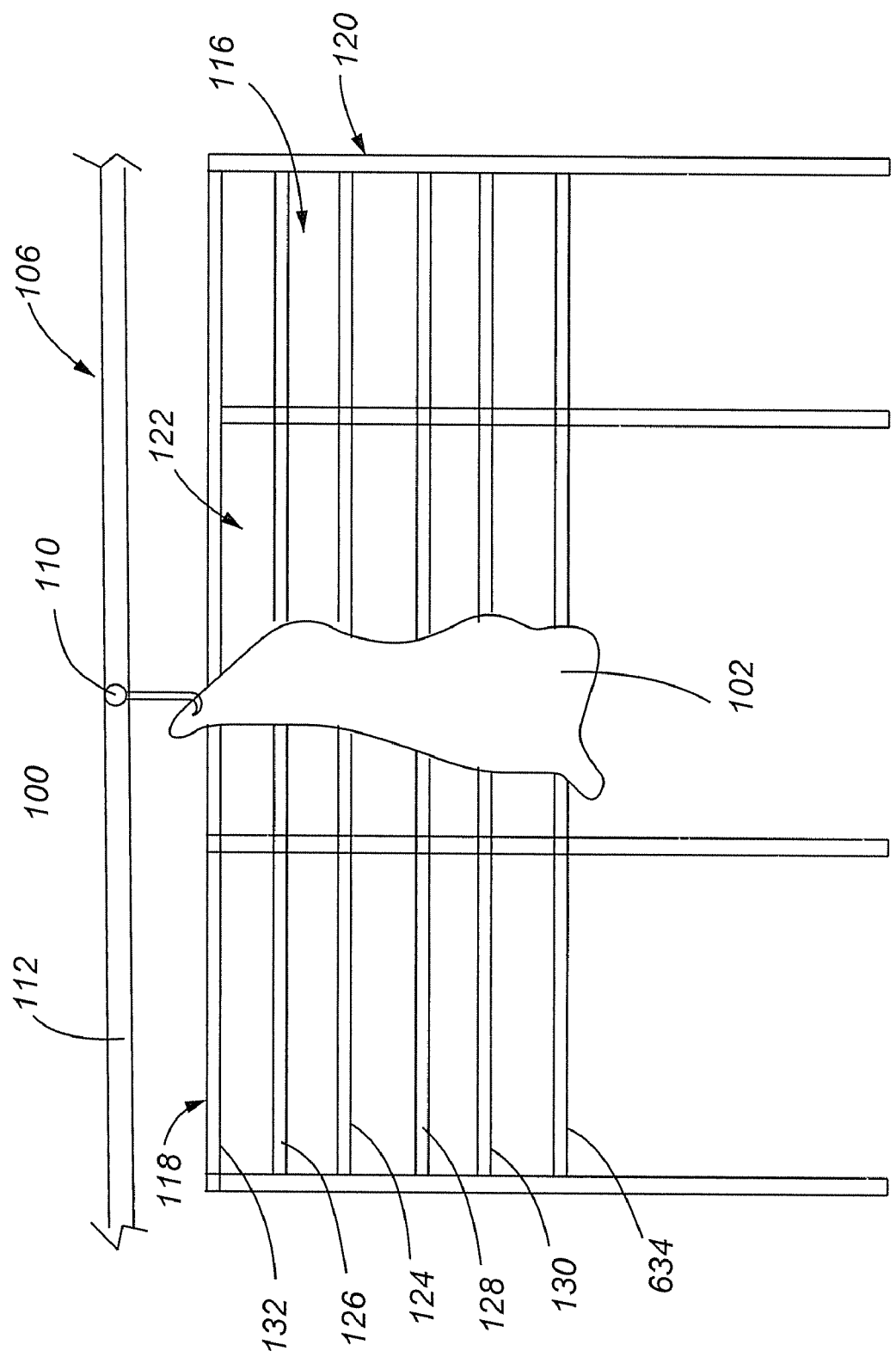
FIG. 12 depicts still another embodiment of an electrical stimulation apparatus in accordance with the present invention having ground bars configured to contact the carcass in the anterior and posterior end sections of the carcass.

In yet another embodiment of the present invention, as shown in FIG. 12, an additional ground bar contact 634 disposed below lower electrical stimulation bar 130 may be added to the apparatus of FIG. 4 to contact the carcass in the anterior end section. By doing so, the electrical current applied to the anterior end section is split and can flow to either of lower ground bar 128 or additional ground bar 634. It is understood that the split of the electric current need not be symmetrical. By adding an additional ground bar to this section, the voltage differential required to be created by central electrical stimulation bar 124 to electrically stimulate the muscles of the midsection to a greater degree than the muscles of the anterior end section can be reduced.

For example, if the additional ground bar is not added, the central electrical stimulation bar 124 may be required to create a voltage potential that is at least 1.5 times, and preferably about 2 to about 5 times, the voltage potential created by lower electrical stimulation bar 130 in order to deliver a greater amount of electric current to the midsection of the carcass. By adding electrical stimulation bar 634, the central electrical stimulation bar 124 may be required to create a voltage potential that is from 0.75 to 1.5 times, and preferably 1-1.5 times, the voltage potential created by lower electrical stimulation bar 130 in order to deliver a greater amount of electric current to the carcass. It is contemplated that it may not be necessary to create a voltage potential that is more than the voltage potential created by lower electrical stimulation bar 130 if the anterior end section provides a greater amount of resistance, for example, than the midsection of the carcass. If a substantially greater amount of resistance is provided by the muscles, connective tissue, etc., in the anterior end section relative to the midsection, for example, a higher voltage need not necessarily be created in the midsection to provide a greater amount of electric current in the midsection.

In this embodiment, the rail 112 serves as a second ground for the electric current delivered by upper electrical stimulation bar 132 along with upper ground bar 126. However, optionally, instead an additional ground bar 636 may be added to the apparatus of FIG. 4 and used as a second ground instead of the rail 112. Typically, the additional ground bar 636 is disposed above upper electrical stimulation bar 132. In this way, the central electrical stimulation bar 124 may be required to create a voltage potential that is from 0.75 to 1.5 times, and preferably 1-1.5 times the voltage potential created by upper electrical stimulation bar 132 in order to deliver a greater amount of electric current to the carcass.

It is understood that the additional ground contacts, i.e., additional ground bars 634, 636, may similarly be of any suitable structure to contact the animal carcass and provide a ground for electrical current applied to the carcass. The additional ground contacts may be in the form of an elongated rub bar as shown or alternatively any other suitable structure, such as a segmented bar, a stake, or the like.

In yet another aspect of the present invention, any of the methods apparatuses of the present invention may be modified to electrically stimulate only the anterior end section and/or posterior end section of the carcass. For example, apparatus 100 could be provided with upper electrical stimulation bar 132 and lower electrical ground bar 126 (and not bars 124, 128, and 130) to provide electrically stimulated muscles in the anterior end section of carcass 102 only. The midsection and the posterior end section of the carcass receive comparatively a minimal amount of electric current, if any. In another embodiment, apparatus 100 could be provided with lower electrical stimulation bar 130 and lower ground bar 128 (and not bars 124, 126, and 132) to provide electrically stimulated muscles in the posterior end section of the carcass only. In this embodiment, the midsection and the anterior end section of the carcass receive a minimal amount of electric current, if any.

In still another embodiment, apparatus 100 could be provided without central electrical stimulation bar 124. In this way, apparatus 100 would focus electric current in the anterior end section and posterior end sections of the carcass only. As described above, the amount of electric current delivered to the carcass may be varied as desired so as to electrically stimulate the carcass without overstimulating the muscles, thereby avoiding unwanted purge problems.

In another aspect of the present invention, any apparatuses and methods of the present invention may be modified to cool the electrically stimulated muscles of the carcass sufficiently to prevent purge problems in the muscles. In other words, since it is desirable that the muscles of the carcass are sufficiently cooled prior to rigor mortis and because electrical stimulation typically increases the muscle temperature once substantially all of the particular muscle fibers of the targeted muscles are contracted, the present invention further includes cooling the carcass before, after, and/or simultaneously to the application of electric current to the carcass. The cooling may be performed by any suitable method. In one embodiment, the carcass is electrically stimulated in a relatively cooler environment, for example, at a temperature of between about 0° F. and 65° F., and more preferably between about 40° F. and 60° F.

In another embodiment, the carcass is electrically stimulated and thereafter cooled, such as by blowing relatively cool air on the previously electrically stimulated muscles for a predetermined amount of time. Preferably, the temperature of the air directed at the previously electrically stimulated muscles is from about 0° F. to 65° F., and more preferably from about 40° F. to about 60° F. In this way, the muscles of the carcass do not "overheat" or remain a temperature that increases the likelihood of purge problems. In another embodiment, the targeted muscles of the carcass are cooled prior to electrical stimulation of the targeted muscles.

In another aspect of the present invention, the tenderness of the meat before and/or after electrical stimulation may be monitored to ensure the targeted section or sections of the carcass are electrically stimulated to the desired extent. For example, in one embodiment, an apparatus, such as apparatus 100 shown in FIG. 4, may selectively electrically stimulate the carcass. Thereafter, any suitable cutting technique and/or assay may be used to determine whether the muscles have been tenderized to their desired degree.

For example, if a shear value of the meat is too low as measured by a suitable device for measuring shear force, the carcass may be advanced to a second similar electrical stimulation apparatus to receive an additional amount of electric current. The amount of any subsequent application(s) of electric current to any of the sections of the carcass may be greater than, equal to, or less than the amount of electric current delivered to the desired sections of the carcass initially.

In the same way, the degree of marbling of the muscles may be analyzed by any suitable apparatus, such as a VerifEYE Carcass Inspection System (CIS), supplied by eMerge Interactive, Inc. If the degree of marbling is not of a desired degree, the corresponding meat section may similarly be subjected to further electrical stimulation. It is contemplated by the present invention that any test regarding the tenderness and/or quality of the meat may be performed manually or in-line at a commercial speed so as to not slow processing of multiple carcasses in a facility.

In a further aspect of the present invention, any other method for tenderizing the meat of a carcass may be used in combination with the methods and apparatus for electrically stimulating a carcass as described herein.

In one embodiment, an electrical stimulation protocol in accordance with the present invention is combined with one or more physical characteristics of the animal to increase tenderness of the final meat product from the carcass. In one embodiment, the age of the animal at slaughter is optimized to promote tenderness. In particular, one study, Cross et al., *Influence of Breed, Sex, Age, and Electrical Stimulation on Carcass and Palatability Traits of Three Bovine Muscles*, J. Anim. Sci., Vol. 58, No. 6, 1984, the entirety of which is incorporated by reference, the authors found that as slaughter age increased up to 18 months, generally longissimius dorsi sensory ratings for juiciness, ease of fragmentation, amount of connective tissue, and tenderness tended to increase. Thus, an animal slaughtered at about 18 months in combination with any electrical stimulation protocol provided herein should optimally promote tenderness of the meat.

In another embodiment, the chilling rate of the carcass can be varied to increase the tenderness of the meat. It is known that chilling rate after slaughter may have a significant effect on tenderness. One particular study, Hildrum et al., *Combined effects of chilling rate, low voltage electrical stimulation, and freezing on sensory properties of bovine M longissimus dorsi*, Meat Sci. 52: 1-7 (1999), the entirety of which is incorporated by reference, found that the chilling rate of carcasses had highly significant effects on final beef tenderness. According to the study "[t]he major effect of chilling rate on tenderness was probably due to cold shortening at lower temperatures." Preferably, the internal temperatures of the muscles to be electrically stimulated are not chilled to below 60° F. prior to electrical stimulation and prior to rigor mortis. Further optimally, the carcass is cooled to a temperature of from about 50 to 70° F. before, during, and/or after the application of electrical current to the carcass to optimally tenderize the meat.

In another embodiment, the carcass may be infused with a calcium chloride solution to improve the tenderness of the beef in combination with any electrical stimulation protocol as disclosed herein. One study, Clare et al., *Improving Tenderness of Normal and Callipyge Lambs with Calcium Chloride*, J. Anim. Sci., 75: 377-385 (1997), the entirety of which is incorporated by reference, found that the addition of calcium accelerated postmortem tenderization. Yet another study, Wheeler et al., *Effects of calcium chloride injection and hot boning on the tenderness of round muscles*, J. Anim. Sci. 69:4871, the entirety of which is incorporated by reference, found that injecting $CaCl_2$ (10% wt/wt of 300 mM solution) increased tenderness and improved overall tenderness ratings in beef. Thus, the injection of a calcium chloride solution into the carcass may be combined with any electrical stimulation protocol disclosed herein to promote tenderness of the meat.

In another embodiment, the carcass may be aged to improve the tenderness of the meat in combination with any electrical stimulation protocol disclosed herein. In one study, *Effects of Postmortem Aging on Beef Tenderness and Aging Guidelines to Maximize Tenderness of Different Beef Subprimal Cuts*, Mies et al., Colorado State University, Dept. of Animal Science, the entirety of which is incorporated by reference herein, the authors determined that the minimum recommended postmortem aging time for steaks from the rib section, based upon the scientific literature, was 11 to 15 days; the chuck roll and shoulder clod cuts from the chuck should be aged a minimum of 12 and 11 days respectively; strip loin and top sirloin should be aged for at 14 days and 21 days respectively; and top round and bottom round cuts should be aged for a minimum of 16 and 12 days respectively. Thus, aging of the meat may be combined with any electrical stimulation protocol described herein to promote tenderness of the meat.

In still another embodiment, any electrical stimulation protocol as described herein may be combined with any suitable "tender-stretch" methods or methods for stretching the muscles of the carcass, including those set forth in U.S. Pat. No. 6,648,744, the entirety of which is incorporated by reference herein. U.S. Pat. No. 6,648,744, for example, discloses a method of separating a vertebra of the carcass prior to rigor mortis and thereafter, electrically stimulating the carcass to provide an animal carcass having electrically stimulated muscles in the midsection and non-electrically stimulated muscles in the anterior and posterior end section. In the method taught by U.S. Pat. No. 6,648,744, the separation of the one or more vertebrae may be conducted without separating the connective tissue, fat, and minor muscles on the portion of the carcass opposite the vertebrae or, in another embodiment, only the connective tissue and fat adjacent the vertebrae are separated during separation of the one or more vertebrae and the separation of this connective tissue and fat is incidental to the vertebrae separation. Alternatively, in the present invention, the connective tissue, fat, and minor muscles of the carcass opposite the vertebrae may be separated.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for differentially electrically stimulating the muscles of an animal carcass, comprising:
    (a) electrically stimulating the muscles of at least a first section of the animal carcass to a first degree; and
    (b) electrically stimulating the muscles of at least a second section of the animal carcass to a second degree less than the first degree;
    wherein the at least a first section comprises a midsection of the animal carcass, wherein the at least a second section of the animal carcass comprises at least one of an anterior end section and a posterior end section of the animal carcass, and wherein at least one of the anterior and posterior end section is targeted for electrical stimulation and receives at least a minor amount of electrical stimulation.

2. The method of claim 1, wherein said electrically stimulating the muscles of at least a second section of the animal carcass to a second degree less than the first degree is done by providing a greater amount of electric current to the at least a first section of the animal carcass.

3. The method of claim 1, wherein said electrically stimulating the muscles of at least a second section of the animal carcass to a second degree less than the first degree is done by applying electric current to the at least a first section for a longer duration than to the at least a second section of the animal carcass.

4. The method of claim 1, wherein said step (a) of electrically stimulating is performed at a different point in time as said step (b) of electrically stimulating.

5. The method of claim 1, further comprising cooling the animal during said steps (a) and (b) of electrically stimulating.

6. The method of claim 1, further comprising, after at least one of steps (a) and (b) of electrically stimulating, determining whether an electrically stimulated section of the animal carcass has been electrically stimulated to a predetermined degree.

7. The method of claim 6, wherein the predetermined degree comprises a shear value for the muscles of the electrically stimulated section of the animal carcass.

8. The method of claim 1, wherein the midsection is defined between about a fifth and sixth thoracic vertebrae and between about a fourth and fifth sacral vertebrae of the animal carcass, wherein the anterior end section extends between about a fifth and sixth thoracic vertebrae to a shoulder end of the carcass, wherein the posterior end section extends between about a fourth and fifth sacral vertebrae to a hind end of the carcass, and wherein the method comprises providing one first electrical stimulation contact, one first ground contact, one second electrical stimulation contact, one second ground contact, and one third electrical stimulation contact.

9. A method for differentially electrically stimulating the muscles of an animal carcass, comprising:
   (a) electrically stimulating the muscles of at least a first section of the animal carcass to a first degree;
   (b) electrically stimulating the muscles of at least a second section of the animal carcass to a second degree less than the first degree; and
   wherein the at least a first section of the animal carcass comprises a midsection, wherein the at least a second section of the animal carcass comprises an anterior end section and a posterior end section, and wherein steps (a) and (b) of electrically stimulating are done by:
   contacting the midsection of the carcass with at least one first electrical stimulation contact;
   contacting the animal carcass with at least one first ground contact above the at least one first electrical stimulation contact;
   contacting the animal carcass with at least one second ground contact below the at least one first electrical stimulation contact;
   contacting the posterior end section of the animal carcass with at least one second electrical stimulation contact; and
   contacting the anterior end section of the animal carcass with at least one third electrical stimulation contact.

10. The method of claim 9, wherein muscles of the anterior and posterior end sections are purposefully electrically stimulated, and wherein the muscles of the anterior and posterior end sections are electrically stimulated to a degree that causes less than a substantial amount of purge in the muscles of the anterior and posterior end sections.

11. A method for differentially electrically stimulating the muscles of an animal carcass, comprising:
   (a) electrically stimulating the muscles of at least a first section of the animal carcass to a first degree; and
   (b) electrically stimulating the muscles of at least a second section of the animal carcass to a second degree less than the first degree;
   wherein said electrically stimulating the muscles of at least a second section of the animal carcass to a second degree less than the first degree is done by providing a shorter rest period between applications of electric current to the at least a first section than a rest period between applications of electric current to the at least a second section of the animal carcass.

* * * * *